United States Patent
Tarascon et al.

(10) Patent No.: US 9,444,102 B2
(45) Date of Patent: Sep. 13, 2016

(54) FLUORO MATERIAL WHICH MAY BE USED AS AN ELECTRODE ACTIVE MATERIAL

(75) Inventors: Jean-Marie Tarascon, Mennecy (FR); Prabeer Barpanda, Tokyo (JP); Mohamed Ati, Amiens (FR); Jean-Noel Chotard, Amiens (FR); Michel Armand, Paris (FR)

(73) Assignee: Centre National De La Recherche Scientifique, Paris (FR)

( * ) Notice: Subject to any disclaimer, the term of this patent is extended or adjusted under 35 U.S.C. 154(b) by 216 days.

(21) Appl. No.: 14/002,424

(22) PCT Filed: Mar. 8, 2012

(86) PCT No.: PCT/FR2012/050483
§ 371 (c)(1),
(2), (4) Date: Apr. 16, 2014

(87) PCT Pub. No.: WO2012/146842
PCT Pub. Date: Nov. 1, 2012

(65) Prior Publication Data
US 2014/0306149 A1    Oct. 16, 2014

(30) Foreign Application Priority Data
Mar. 8, 2011    (FR) ..................... 11 51864

(51) Int. Cl.
*H01M 4/58*    (2010.01)
*H01M 4/62*    (2006.01)
(Continued)

(52) U.S. Cl.
CPC .............. *H01M 4/582* (2013.01); *C01D 15/06* (2013.01); *C01G 49/009* (2013.01); *C01G 49/14* (2013.01); *H01M 4/5825* (2013.01); *H01M 4/622* (2013.01); *C01P 2002/50* (2013.01); *C01P 2002/72* (2013.01); *C01P 2002/76* (2013.01); *C01P 2002/77* (2013.01);
(Continued)

(58) Field of Classification Search
CPC .. H01M 4/582; H01M 4/622; H01M 4/5825; H01M 10/052; C01G 49/009; C01G 49/14; C01D 15/06; C01P 2002/77; C01P 2002/88; C01P 2002/76; C01P 2004/04; C01P 2004/82; C01P 2002/50; C01P 2002/72
See application file for complete search history.

(56) References Cited

U.S. PATENT DOCUMENTS

2010/0276632 A1* 11/2010 Barker ................ C01G 45/006
252/182.1

FOREIGN PATENT DOCUMENTS

WO    WO2010046610    4/2010

OTHER PUBLICATIONS

Barpanda et al. J. Mater. Chem, 2010, 20, 1659-1668.*
Barpanda et al. J. Mater. Chem., 2010, 20, 1659-1668.*
Barpanda and Ati et al. Nature Materials, vol. 10, Oct. 2011, pp. 772-779.*

(Continued)

*Primary Examiner* — Peter F Godenschwager
*Assistant Examiner* — Andrew J Oyer
(74) *Attorney, Agent, or Firm* — Sofer & Haroun, LLP

(57) ABSTRACT

A fluoro material is provided for use as an electrode active material as well as a process tar producing it. The material includes particles of a fluorosulfate which corresponds to formula (I) $Li_{1-y}Fe_{1-x}Mn_xSO_4F$ (I) in which $0 < x \leq 1$ and $0 \leq y < 1$. The material includes a phase of triplite structure and optionally a phase of tavorite structure, the phase of triplite structure representing at least 50% by volume. The material may be obtained from precursors of the elements of which it is constituted, via a ceramic route, via an ionothermal route or via a polymer route.

1 Claim, 16 Drawing Sheets

(51) Int. Cl.
*C01G 49/14* (2006.01)
*C01G 49/00* (2006.01)
*C01D 15/06* (2006.01)
*H01M 10/052* (2010.01)

(52) U.S. Cl.
CPC ...... *C01P 2002/88* (2013.01); *C01P 2004/04* (2013.01); *C01P 2004/82* (2013.01); *H01M 10/052* (2013.01)

(56) References Cited

OTHER PUBLICATIONS

Trupathi et al Energy Environ. Sci., 2012, 5, 6238-6246.*
Search Report dated 2012.
Jean-Marie Tarascon "Journal of Materials Chemistry" Dated Mar. 7, 2010.

* cited by examiner $2\theta$ (°)

FLUORO MATERIAL WHICH MAY BE USED AS AN ELECTRODE ACTIVE MATERIAL

RELATED APPLICATIONS

This application is a National Phase Application of PCT/FR2012/050483, filed on Mar. 8, 2012, which in turn claims the benefit of priority from French Patent Application No. 11 51864 filed on Mar. 8, 2011, the entirety of which are incorporated herein by reference.

BACKGROUND

1. Field of the Invention

The present invention relates to a fluoro material which may be used as an electrode active material, and also to a process for producing it.

2. Description of Related Art

Lithium batteries are known which use an insertion compound as operating basis for the positive electrode, such as $Li_xCoO_2$, $0.4 \leq x \leq 1$, which is used neat or as a solid solution with nickel and manganese and aluminum. The main barriers to the spread of this type of electrochemistry are the scarcity of cobalt and the excessively positive potential of the transition metal oxides, the consequences of which are safety problems for the battery.

$Li_xT^M{}_mZ_yP_{1-s}Si_sO_4$ compounds ("oxyanions") are also known, in which $T^M$ is chosen from Fe, M and Co, and Z represents one or more elements which have a valency of between 1 and 5 and which can be replaced in the sites of the transition metals or of the lithium. These compounds exchange only lithium, and have only very low electron and ionic conductivity. These handicaps may be overcome by using very fine particles (such as nanoparticles) and by depositing a carbon coat by pyrolysis of organic compounds. The drawbacks associated with the use of nanoparticles are low compactness, which is reflected by a loss of specific energy, and this problem is further exacerbated by the deposition of carbon. Furthermore, the deposition of carbon takes place at high temperature, under reductive conditions. In practice, it is difficult to use transition elements other than $Fe^{II}$ and $Mn^{II}$, since the elements $Co^{II}$ and $Ni^{II}$ are readily reduced to the metal state. This is likewise the case for $Fe^{III}$, $Mn^{III}$, $Cr^{III}$, $V^{III}$ and $V^{IV}$, which are advantageous dopants for increasing the ionic or electron conductivity.

Other compounds have been proposed, especially compounds corresponding to the general formula $A_aM_b(SO_4)_cZ_d$ in which A represents at least one alkali metal, Z represents at least one element chosen from F and OH, and M represents at least one divalent or trivalent metal cation. L. Sebastian, et al., [J. Mater. Chem. 2002, 374-377] describe the preparation of $LiMgSO_4F$ via a ceramic route, and also the crystallographic structure of said compound, which is isotypic of the structure of tavorite $LiFeOHPO_4$. The authors mention the high ionic conduction of this compound, and suggest that the $LiMSO_4F$ compounds in which M is Fe, Co or Ni, which would be isostructural, appear to be important for the insertion/redox extraction of lithium involving $M^{II}/M^{III}$ oxidation states. The authors also state that the preparation of Fe, Ni or Co compounds via a ceramic route is underway, but no subsequent publication regarding these compounds has been made.

In addition, US 2005/0 163 699 describes the ceramic preparation of the abovementioned compounds $A_aM_b(SO_4)_cZ_d$. The technique is illustrated by concrete examples concerning compounds in which M is Ni, Fe, Co, Mn (Mn+Mg), (Fe+Zn) or (Fe+Co). These compounds are prepared ceramically from LiF, which is the Li precursor, and from the sulfate of the element or elements M. Among these compounds, the most advantageous are compounds which contain Fe, since, besides their relatively low cost, they are capable on the basis of structural and chemical considerations (especially the ionocovalence of the bonds) of having advantageous electrochemical properties in a desirable potential range for ensuring reliable use for large-volume applications. For reasons of inductive effect, sulfates should have higher potentials than phosphates, irrespective of their structure. Examples of preparation of compounds containing various metal elements are described, but no electrochemical property is reported. Thus, example 2 describes the preparation of the compound $LiFeSO_4F$ via a ceramic method at 600° C., which gives an inhomogenous compound, and then 500° C. in which the compound is red-black, or else at 400° C. in air, in which the compound is red. This method is capable of enabling the reduction of the $SO_4^{2-}$ group via $Fe^{2+}$ in the absence of oxygen according to: $SO_4^{2+}+Fe^{2+} \Rightarrow SO_2+2O^{2-} 2Fe^{3+}$. The red color observed in the compounds obtained at the various temperatures is due to the $O^{2-}/Fe^{3+}$ combination in a crystal lattice such as the oxide $Fe_2O_3$. It is moreover known that $Fe^{II}$ compounds become oxidized in air from 200° C., giving $Fe^{III}$, and the preparation of example 2 at 400° C. in air confirms this. The compounds containing iron which are prepared ceramically from LiF and iron sulfate according to US-2005/0 163 699 therefore do not consist of $LiFeSO_4F$. Similarly, it appears that the compounds in which M is Co or Ni are unstable at the temperatures used during the recommended ceramic-route preparation. It is therefore implausible that the compounds described in US-2005/0 163 699 were really obtained.

WO 2010/00466610 describes a process for preparing compounds $LiMSO_4F$ in which M represents one or more transition metals, in particular Fe partially replaced with Mn. These compounds are obtained via ionothermal synthesis starting with LiF and a hydrated (preferably monohydrate) M sulfate which has a structure similar to that of tavorite, in terms of arrangements of octahedra and tetrahedra. Their structure is similar to that of the precursor sulfate. These materials may be used as cathode active material and operate at a potential of about 3.6 V.

The performance qualities of a lithium battery depend especially on the redox potential of the cathode active material. In particular, the energy density delivered by the battery is higher if the redox potential of the cathode active material is higher, all things being otherwise equal.

The aim of the present invention is consequently to propose a novel material that is useful as a cathode active material in a lithium battery, and also a process for manufacturing it.

OBJECTS AND SUMMARY

The subject of the present invention is novel fluorosulfate materials, a process for producing said materials reliably, rapidly and economically, and also the use of certain materials, especially as cathode active material of a lithium battery or of a lithium ion battery.

A material of the present invention consists of particles of a fluorosulfate which corresponds to formula (I) $Li_{1-y}Fe_{1-x}Mn_xSO_4F$ (I) in which $0<x \leq 1$ and $0 \leq y<1$. It is characterized in that it essentially comprises a phase of triplite structure and optionally a phase of tavorite structure, the phase of triplite structure representing at least 50% by volume.

LiMnSO$_4$F crystallizes in a monoclinic cell (space group C2/c) with lattice parameters a=13.27010(11) Å, b=6.41616 (4) Å, c=10.03895(6) Å, β=120.5850(3)° V=735.83(5) Å$^3$, and Z=8. The full crystallographic data are given in the following table. WP means "Wyckoff positions", DO means "degree of occupancy" and Biso is the isotropic Debye-Waller factor. The high value of $\chi^2$ essentially reflects the very high counting statistics obtained by a two-dimensional detector in the synchrotron X-ray diffraction.

| | | Space group C2/c | | | | |
|---|---|---|---|---|---|---|
| | | a = 13.27010 (11) Å | b = 6.41616 (4) Å | c = 10.03895 (6) Å | β = 120.5850 (3) ° | V = 735.83 (5) Å$^3$ |
| | Confidence factors | | R$_p$ = 2.58 | R$_{wp}$ = 3.51 | R$_{Bragg}$ = 3.11 | X$^2$ = 2/20 |
| Atoms | WP | x | y | z | Biso | DO |
| S | 8f | 0.8259 (4) | 0.0916 (6) | 0.1946 (4) | 0.56 (6) | 1 |
| Li1 | 8f | 0.6434 (4) | 0.1003 (7) | 0.3413 (5) | 0.97 (6) | 0.46 |
| Mn1 | 8f | 0.6434 (4) | 0.1003 (7) | 0.3413 (5) | 0.97 (6) | 0.54 |
| Li2 | 8f | 0.5505 (4) | 0.2414 (8) | 0.9919 (5) | 0.97 (6) | 0.47 |
| Mn2 | 8f | 0.5505 (4) | 0.2414 (8) | 0.9919 (5) | 0.97 (6) | 0.53 |
| F | 8f | 0.5146 (7) | 0.0929 (13) | 0.3927 (7) | 0.76 (8) | 1 |
| O1 | 8f | 0.9147 (10) | 0.0303 (13) | 0.3537 (11) | 0.76 (8) | 1 |
| O2 | 8f | 0.7166 (7) | 0.1377 (14) | 0.1897 (9) | 0.76 (8) | 1 |
| O3 | 8f | 0.8663 (7) | 0.2706 (13) | 0.1492 (9) | 0.76 (8) | 1 |
| O4 | 8f | 0.6934 (7) | 0.4191 (14) | 0.4141 (10) | 0.76 (8) | 1 |

The structure of LiMnSO$_4$F is isostructural with the triplite structure of minerals (Mn$^{II}$, Fe$^{II}$, Mg$^{II}$, Ca$^{II}$)$_2$(PO$_4$) (F, OH). It consists of SO$_4$ tetrahedra and of MO$_4$F$_2$ octahedra centered on M (M being Li and Mn). The Li and Mn atoms share the same crystallographic sites, each with a relative degree of occupancy of about 50%. Thus, the Li atoms are trapped inside MO$_4$F$_2$ octahedra. The F atoms occupy a cis position. The octahedra share an edge rather than a peak, and they alternately share either two O atoms or two F atoms. Chains of M$^1$O$_4$F octahedra are thus formed in the direction [101] and chains of M$^2$O$_4$F octahedra are formed along the axis b, said chains being linked together by sharing an O atom and a F atom on one edge. A chain of M$^1$O$_4$F octahedra in the direction [101] is virtually perpendicular to a chain of M$^2$O$_4$F octahedra oriented along the axis b. The M$^1$SO$_4$F octahedra are centered on Li and Mn atoms denoted by Li$^1$ and Mn$^1$. The M$^2$SO$_4$F octahedra are centered on Li and Mn atoms denoted by Li$^2$ and Mn$^2$. In this structure, the SO$_4$ tetrahedra are linked via peaks with four neighbouring chains of octahedra (2 M$^1$O$_4$F$_2$ and 2 M$^2$O$_4$F$_2$) by sharing oxygen atoms. Such a structure is very dense and does not comprise any tunnels that would enable the diffusion of Li ions.

The mass per unit volume calculated from the lattice parameters is 3.19 g·cm$^{-3}$. When only some of the sites M$^1$ and M$^2$ are occupied by Fe, the three metals (Li, Mn and Fe) occupy the sites M$^1$ and M$^2$ mentioned previously in a disordered manner, and the triplite structure is preserved, up to an Fe content of 98 atom %.

The crystallographic characterization of LiMnSO$_4$F was performed by X-ray diffraction (synchrotron beam, Swiss Norwegian Beam Line, ESRF, Grenoble, France).

FIG. 1 represents the synchrotron X-ray diffraction diagram of an LiMnSO$_4$F powder. The intensity I (in arbitrary units) is given on the y-axis, and the diffraction angle 2θ is given on the x-axis. The wavelength used is 0.709595 Å. The points represent the experimental data, the curve connecting the points represents the calculated values, the vertical bars under the diagram represent the Bragg positions and the curve under the Bragg positions represents the difference between the experimental diagram and the curve resulting from the calculated values.

FIG. 2 represents interconnected chains of M$^1$O$_4$F$_2$ octahedra (light gray) and chains of M$^2$O$_4$F$_2$ octahedra (medium gray) which share edges, said octahedra having 4 O atoms and 2 F atoms. The O atoms are represented by • and the F atoms are represented by □.

FIG. 3 represents the virtually perpendicular arrangement of the interconnected chains of M$^1$O$_4$F$_2$ octahedra (light gray) and of M$^2$O$_4$F$_2$ octahedra (medium gray) oriented, respectively, along the axes [101] and b.

FIGS. 4 and 5 represent the M$^1$O$_4$F$_2$ octahedra (light gray) and the M$^2$O$_4$F$_2$ octahedra (medium gray) which share edges, and the SO$_4$ tetrahedra (dark gray) which share peaks, along the axes [101] and b, respectively.

A material (I) according to the invention may be obtained from the precursors of the elements of which it is constituted, via a ceramic route, via an ionothermal route or via a polymer route. Li and F are provided by a common precursor LiF. Fe, Mn and SO$_4$ are provided by a common precursor Fe$_{1-x}$Mn$_x$SO$_4$·H$_2$O.

The precursors are used in substantially stoichiometric amounts corresponding to the formula LiFe$_{1-x}$Mn$_x$SO$_4$F of the desired material. The term "substantially stoichiometric" means that an excess of lithium fluoride is tolerated, preferably of not more than 15 atom %.

The Fe precursor is preferably a hydrated iron sulfate. The Mn precursor is a hydrated Mn sulfate. The two precursors are preferably used in the form of a mixed sulfate Fe$_{1-x}$Mn$_x$SO$_4$·H$_2$O, which may be obtained via a process comprising the following steps:
  dissolution of 1−x mol of FeSO$_4$·7H$_2$O and x mol of MnSO$_4$·H$_2$O in water;
  addition of an alcohol (for example ethanol or isopropanol) to bring about precipitation of Fe$_{1-x}$Mn$_x$SO$_4$ polyhydrate;
  recovery (for example by centrifugation) of the powder formed,
  washing with alcohol and then heating to a temperature of between 150 and 250° C. (for example to 200° C.) under vacuum for one hour, to obtain the monohydrate precursor Fe$_{1-x}$Mn$_x$SO$_4$·H$_2$O.

The preparation of the mixed precursor Fe$_{1-x}$Mn$_x$SO$_4$·H$_2$O must be performed under conditions that avoid the formation of Fe$^{III}$. It is consequently preferable to use water that has been degassed beforehand with argon or nitrogen, to work under an argon or nitrogen atmosphere, and/or to add a reducing agent (for example ascorbic acid) to the aqueous solution.

A process for preparing the material (I) of the invention comprises the steps consisting in:
a) preparing a mixture of the precursors, in the appropriate proportions;
b) heating the mixture of precursors to the reaction temperature $T_c$ at a heating rate of 1 to 10° C./min;
c) maintaining the mixture at the temperature $T_c$;
d) allowing the mixture to cool to room temperature.

The process for preparing the material (I) may be performed via a ceramic route, via an ionothermal route or via a polymer route.

In each of these three particular embodiments, the process may comprise a step a' between steps a) and b), said step a' being a step of preheating the mixture of precursors to a temperature $T_b$ between 190° C. and 210° C., step b) then consisting in raising the temperature from $T_b$ to $T_c$.

The conditions for performing the heating of step a') are not critical. Step a') may be performed by placing the reactor containing the reaction mixture in an oven at room temperature, which will then be brought to the temperature $T_b$. Preferably, the reactor containing the reaction medium is placed in an oven brought beforehand to the temperature $T_b$.

The temperature $T_c$ is chosen within a range in which the upper limit depends on the thermal stability of the fluorosulfate to be prepared and on the stability of the support medium for the reaction, where appropriate, and the lower limit depends on the chosen route (ceramic, ionothermal or polymer).

The process of the invention performed via a ceramic route comprises the steps consisting in:
a) preparing a mixture of the precursors, in the appropriate proportions;
a') optionally preheating the mixture of precursors to a temperature $T_b$ between 190° C. and 210° C.;
b) heating the mixture of precursors to the reaction temperature $T_c$ between 285° C. and 340° C. (preferably 295° C.) at a heating rate of 1 to 10° C./min (preferably from 2 to 3° C./min);
c) maintaining the mixture at this temperature for a duration of at least 15 hours;
d) allowing the mixture to cool to room temperature.

In a particular embodiment, precursors are mixed together in a ball mill. The powdered mixture of precursors is preferably pelletized by compression before being introduced into the reactor.

If the temperature $T_c$ is maintained while the material with a triplite structure is formed, the crystallographic structure remains unchanged, but growth of the grains is observed.

The process for preparing a material (I) according to the invention performed via an ionothermal route comprises the steps consisting in:
a) preparing the mixture of precursors by dispersing a mixture of the mixed sulfate $Fe_{1-x}Mn_xSO_4 \cdot H_2O$ and LiF in the appropriate proportions in a support liquid consisting essentially of at least one ionic liquid, to obtain a suspension of said precursors in said support liquid,
a') optionally preheating the mixture of precursors to a temperature $T_b$ between 190° C. and 210° C.;
b) heating the mixture of precursors up to the reaction temperature $T_c$ between 310° C. and 340° C. at a heating rate of 1 to 10° C./min (preferably from 2 to 3° C./min);
c) maintaining the mixture at this temperature $T_c$ for a duration of at least 7 days;
d) allowing the mixture to cool to room temperature, and then extracting the fluorosulfate from the reaction mixture.

The expression "support liquid consisting essentially of at least one ionic liquid" means that the support liquid contains at least 90% by weight of one or more ionic liquids. The support liquid may also contain traces of water (preferably less than 10 000 ppm) or not more than 10% of an alcohol, for example methanol or ethanol.

The amount of precursors present in the ionic liquid during step a) is preferably from 0.01% to 85% by mass and more preferentially from 5% to 60% by mass.

The term "ionic liquid" means a compound which contains only anions and cations which compensate their charges, and which is liquid at the temperature of the reaction for formation of the compounds of the invention, either neat or as a mixture with an additive.

According to a preferred embodiment of the invention, the cation of the ionic liquid is chosen from ammonium, phosphonium, sulfonium, iodonium, pyridinium, imidazolium, pyrazolium, acetamidium, oxazolinium, thiazolium, pyrrolidinium, piperidinium, imidazolinium, and guanidinium cations, said cations optionally bearing substituents.

When the cation of the ionic liquid is an imidazolium cation, it is desirable for the carbon at C2 of the imidazolium ring to be protected with an alkyl group, preferably containing from 1 to 4 carbon atoms, due to the fact that the Li precursor is a fluoride. Failing this, the acidic proton borne by the carbon at C2 would bring about the decomposition of the cation of the ionic liquid.

The anion of an ionic liquid is preferably chosen from Cl, Br, I, $RSO_3^-$, $ROSO_3^-$, $[RPO_2]^-$, $[R(R'O)PO_2]^-$, $[(RO)_2PO_2]^-$, $BF_4^-$, $R_fBF_3^-$, $PF_6^-$, $R_fPF_5^-$, $(R_f)_2PF_4^-$, $(R_f)_3PF_3^-$, $R_fCO_2^-$, $R_fSO_3^-$, $[CR_fSO_2)_2N]^-$, $[CR_fSO_2)_2CH]^-$, $[CR_fSO_2)_2C(CN)]^-$, $[R_fSO_2C(CN)_2]^-$, $[(R_fSO_2)_3C]^-$, $N(CN)_2^-$, $C(CN)_3^-$, $[(C_2O_4)_2B]^-$ in which:
R and R', which may be identical or different, each represent a $C_1$-$C_{24}$ alkyl, aryl or ($C_1$-$C_{24}$)alkylaryl radical,
$R_f$ is a fluoro radical chosen from $C_nF_{2n+1}$ in which $0 \leq n \leq 8$, $CF_3OCF_2$, $HCF_2CF_2$ and $C_6F_5$.

An ionic liquid with a high hydrophobic nature promotes the reaction between the precursor LiF and the precursor $Fe_{1-x}Mn_xSO_4 \cdot H_2O$, since it brings about the removal of water at a higher temperature, which promotes formation of the desired material, at the expense of a secondary phase $Fe_{1-x}Mn_xSO_4$. It also makes it possible to perform the synthesis in an open reactor. A hydrophilic ionic liquid is less favorable, and usually leads to a multiphase final product.

1-Butyl-3-methylimidazolium trifluoromethanesulfonate (triflate) (BMI-triflate) and 1-ethyl-3-methylimidazolium bis(trifluoromethanesulfonyl)imide (EMI-TFSI) are examples of hydrophobic ionic liquids. EMI-TFSI, which is more hydrophobic than BMI-triflate, is particularly preferred.

The heating steps b) and c) are preferably performed under an inert atmosphere, at atmospheric pressure. Specifically, one of the important advantages of the ionothermal process in accordance with the invention is that it does not require a pressurized chamber due to the absence of volatility of the ionic liquid(s).

The heating may be performed by various means, especially by heating in an oven, or by microwave heating. It may be performed continuously, in a heated chamber in which circulate the ionic liquid and the precursors of compound (I), with a residence time that enables the reaction to be complete.

The duration of the heating step d) is generally about 7 days. If the material is not a single phase having the triplite structure after a heat treatment of 7 days, it suffices to increase the heating time, before extracting the material from the support ionic liquid of the reaction. In addition, the choice of a support ionic liquid having a higher stability temperature, which makes it possible to perform the reaction at a higher temperature, promotes the formation of the triplite phase to the expense of the tavorite phase.

The separation of compound (I) in step e) may be performed via any technique known to those skilled in the art, in particular by extraction with a solvent for the ionic liquid or by centrifugation, and removal of any byproducts with an alcohol, a nitrile, a ketone or a chloroalkane containing from 1 to 6 carbon atoms.

After separation, the material (I) may be washed with an organic solvent, for instance acetone, acetonitrile or ethyl acetate.

The process for preparing a material (I) according to the invention performed by a polymer route comprises the steps consisting in:
a) preparing a mixture of precursors by dispersing a mixture of the mixed sulfate $Fe_{1-x}Mn_xSO_4 \cdot H_2O$ and of LiF in the appropriate proportions in a polymer;
a') optionally preheating the mixture of precursors to a temperature $T_b$ of between 190° C. and 210° C.;
b) heating the mixture of precursors to the reaction temperature $T_c$ of between 290° C. and 340° C. with a heating rate of 1 to 10° C./min (preferably from 2 to 3° C./min);
c) maintaining the mixture at this temperature for a time of at least 20 hours;
d) allowing the mixture to cool to room temperature, and then extracting the fluorosulfate from the reaction mixture, the entire process being performed under non-oxidative conditions.

The non-oxidative conditions may be achieved by performing the process in a reactor in which an inert atmosphere is maintained, for example by circulation of an inert gas. The non-oxidative conditions may also be obtained by placing the mixture of precursors between two films of polymer.

The amount of precursors present in the polymer reaction medium is preferably from 0.01% to 85% by mass and more preferentially from 5% to 60% by mass relative to the total mass of "precursors+polymer".

The polymer which serves as support for the reaction is chosen from polymers that are liquid at the reaction temperature and stable at said temperature. Preferably, a polymer that is solid at room temperature is chosen.

The polymer may especially be a polyethylene glycol (PEG), polyoxyethylene (POE), a polystyrene (PS) or a poly(methyl methacrylate) (PMMA). For each particular preparation case, the polymer is chosen as a function of its stability range, its viscosity and its melting point (which depend on its molar mass). For similar performance, use may be made of a PEG with a lower molecular mass than that of a POE.

In a given type of polymer, an increase in the molar mass brings about an increase in the melting point and in the thermal decomposition temperature. It is within the capability of a person skilled in the art to select the appropriate polymer as a function of the reaction temperature.

A compound (I) may be used in various applications, according to the proportion of the elements of which it is constituted.

The compounds (I) of the invention in which the Mn content is not more than 30% may be used as active material for the manufacture of electrodes in batteries and electrochromic systems.

As indicated previously, the material $Li_{1-y}MnSO_4F$ has a triplite structure and does not show any electrochemical activity that would make it usable as active material of an electrode. Surprisingly, the inventors have found, firstly, that the partial replacement of Mn with Fe does not modify the triplite structure, irrespective of the content of Mn, and, secondly, that the materials in which the Mn content is less than 30% (0<x≤0.3) [materials referred to hereinbelow by $(I_{0.1})$] have electrochemical activity at a potential which is higher than that of the compound $Li_{1-y}FeSO_4F$ and of other Fe compounds which function via the $Fe^{II}/Fe^{III}$ redox reaction, for instance $LiFePO_4$. It is noted that, if a material $Li_{1-y}Fe_{1-x}Mn_xSO_4F$ (x≤0.3) of triplite structure according to the invention and a material $Li_{1-y}Fe_{1-x}Mn_xSO_4F$ (x≤0.3) of tavorite structure obtained according to the prior art are compared, the two having the same Mn content, it appears that the material with a triplite structure according to the invention has a redox potential of 3.9 V (vs $Li^+/Li^0$), whereas the redox potential of the material of the same composition having a tavorite structure is only 3.6 V, although the activity of the material $(I_{0.1})$ is also due solely to the $Fe^{II}/Fe^{III}$ redox reaction, as unequivocally demonstrated by the Mössbauer and XANES characterizations. A material $(I_{0.1})$ may thus advantageously be used as positive electrode active material in a lithium battery, since the higher potential brings about a higher energy density. In a particularly preferred embodiment, the compound $(I_{0.1})$ used as cathode active material is $LiFe_{0.9}Mn_{0.1}SO_4F$.

When a material $(I_{0.1})$ according to the invention is used as electrode material, the electrode may be prepared by depositing onto a current collector a composite material obtained by mixing, via manual milling or mechanical milling (for example by milling for about 16 minutes using a SPEX 1800 mill), a mixture comprising a compound of the invention and carbon. The weight percentage of compound $(I_{0.1})$ relative to the composite material "compound $(I_{0.1})$+ carbon" may be from 50% to 99%, more particularly from 80% to 95%.

The composite material used for the production of an electrode may also contain an additional compound, the weight ratio of compound $(I_{0.1})$/additional compound being greater than 5% and preferably greater than 50%. The additional compound may be, for example, a material of olivine structure such as a phosphate $LiMPO_4$ in which M represents at least one of the elements Fe, Co and Ni, or an oxide $LiCoO_2$ or $LiNiO_2$.

The amount of material deposited on the current collector is preferably such that the amount of material (I) according to the invention is between 0.1 and 200 mg/cm² and preferably from 1 to 50 mg/cm². The current collector may consist of a grate or a sheet of aluminum, titanium, graphite paper or stainless steel.

An electrode according to the invention may be used in an electrochemical cell comprising a positive electrode and a negative electrode separated by an electrolyte. The electrode according to the invention constitutes the positive electrode.

The negative electrode may consist of lithium metal or an alloy thereof, a transition metal oxide forming by reduction a nanometric dispersion in lithium oxide, or a double nitride of lithium and of a transition metal. The negative electrode may also consist of a material that is capable of reversibly inserting Li$^+$ ions at potentials below 1.6 V. Examples of such materials that may be mentioned include low-potential oxides having the general formula $Li_{1+y+z/3}Ti_{2-z/3}O_4$ ($0 \leq z \leq 1$, $0 \leq y \leq 1$), $Li_{4+z}Ti_5O_{12}$ $0 \leq z' \leq 3$, carbon and carbon-based products derived from the pyrolysis of organic materials, and also dicarboxylates.

The electrolyte advantageously comprises at least one lithium salt dissolved in a polar aprotic liquid solvent, in a solvating polymer optionally plasticized with a liquid solvent or an ionic liquid, or in a gel consisting of a liquid solvent gelled by addition of a solvating or non-solvating polymer.

The materials according to the invention may also be used in various applications, in particular as catalyst.

The present invention is illustrated by the following embodiments, to which it is not, however, limited.

BRIEF DESCRIPTION OF THE DRAWINGS

FIG. 21: M48 tavorite-Li$_{1-y}$Fe$_{0.95}$Mn$_{0.05}$ SO$_4$F,

FIG. 22: M10 tavorite-triplite-Li$_{1-y}$Fe$_{0.95}$Mn$_{0.05}$SO$_4$F,

FIG. 23: M20 triplite-Li$_{1-y}$Fe$_{0.95}$Mn$_{0.05}$SO$_4$F

FIG. 24: M'20 the material Li$_{1-y}$Fe$_{0.9}$Mn$_{0.1}$SO$_4$F of example 7 which underwent a heat treatment for 20 days, in accordance with one embodiment.

DETAILED DESCRIPTION

Example 1

Preparation of the Precursor

1–x mol of FeSO$_4$.7H$_2$O and x mol of MnSO$_4$.H$_2$O were dissolved, under a stream of nitrogen, in 5 ml of water degassed beforehand with nitrogen to avoid the oxidation of Fe(II), followed by addition of a few ppm of ascorbic acid and 20 ml of ethanol. The powder formed by precipitation during the addition of the ethanol was recovered by centrifugation, washed twice with 20 ml of ethanol and then heated at 200° C. under vacuum for 1 hour.

Several samples were prepared, by varying the value of x.

Figure 1:
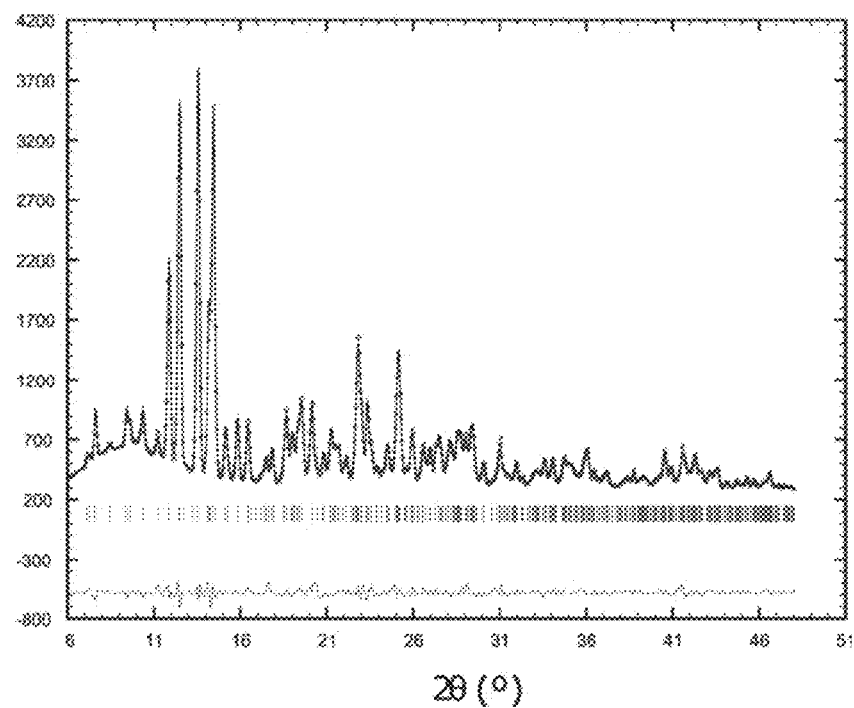
FIG. 1 represents the synchrotron X-ray diffraction diagram of an LiMnSO$_4$F powder, in accordance with one embodiment.
Figure 2:
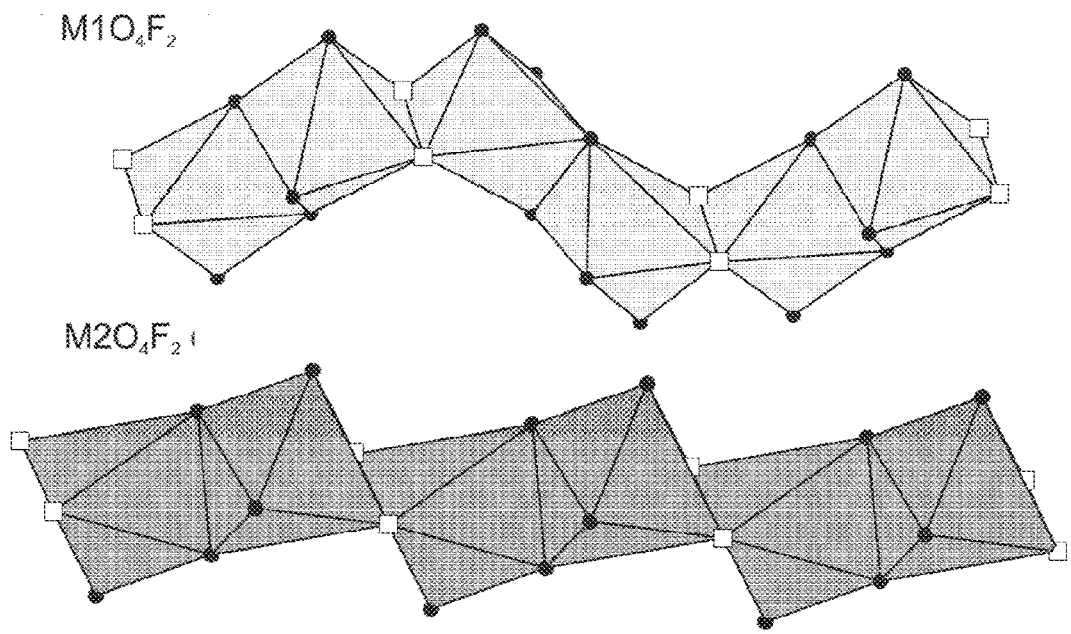
FIG. 2 represents interconnected chains of $M^1O_4F_2$ octahedra (light gray) and chains of $M^2O_4F_2$ octahedra (medium gray), in accordance with one embodiment.
Figure 3:
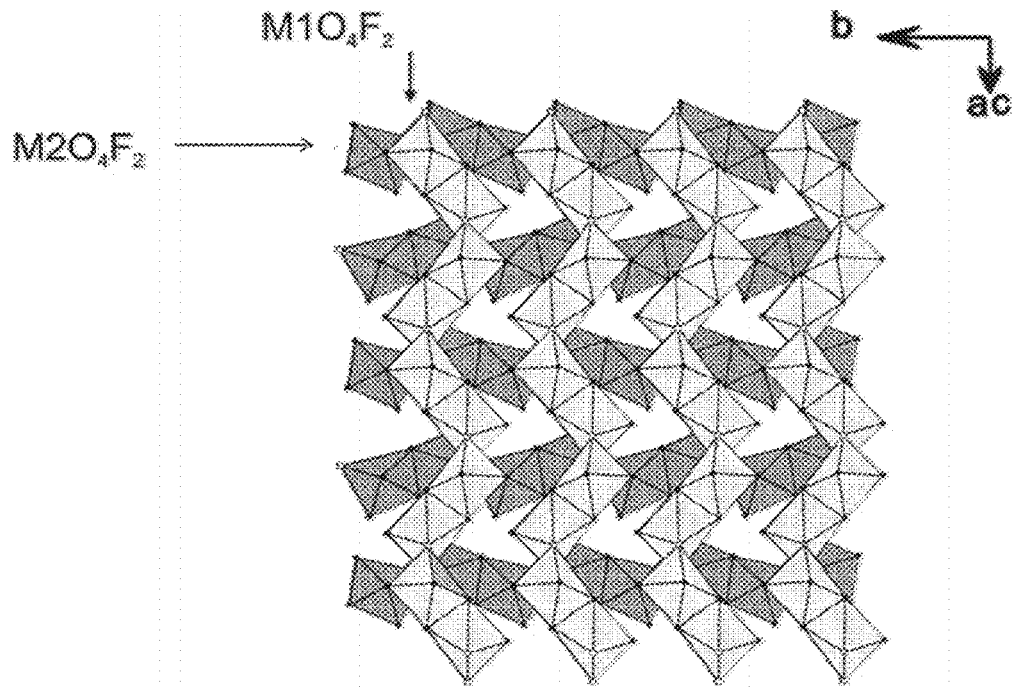
FIG. 3 represents the virtually perpendicular arrangement of the interconnected chains of $M_1O_4F_2$ octahedra (light gray) of $M^2O_4F_2$ octahedra (medium gray), in accordance with one embodiment.
Figure 4:
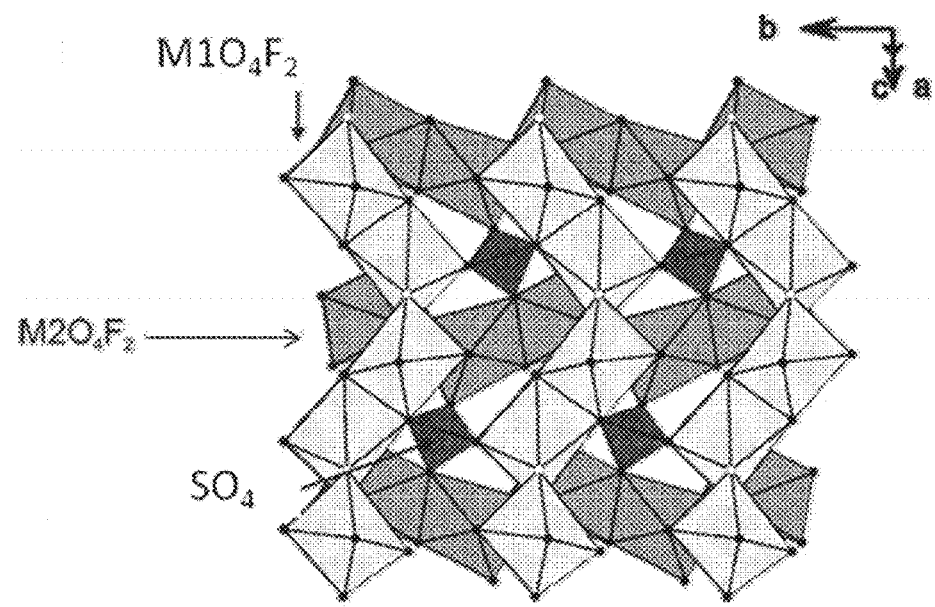
FIGS. 4 and 5 represent the $M^1O_4F_2$ octahedra (light gray) and the $M^2O_4F_2$ octahedra (medium gray) which share edges, and the SO$_4$ tetrahedra (dark gray) which share peaks, along the axes [101] and b, respectively, in accordance with one embodiment.
Figure 5:
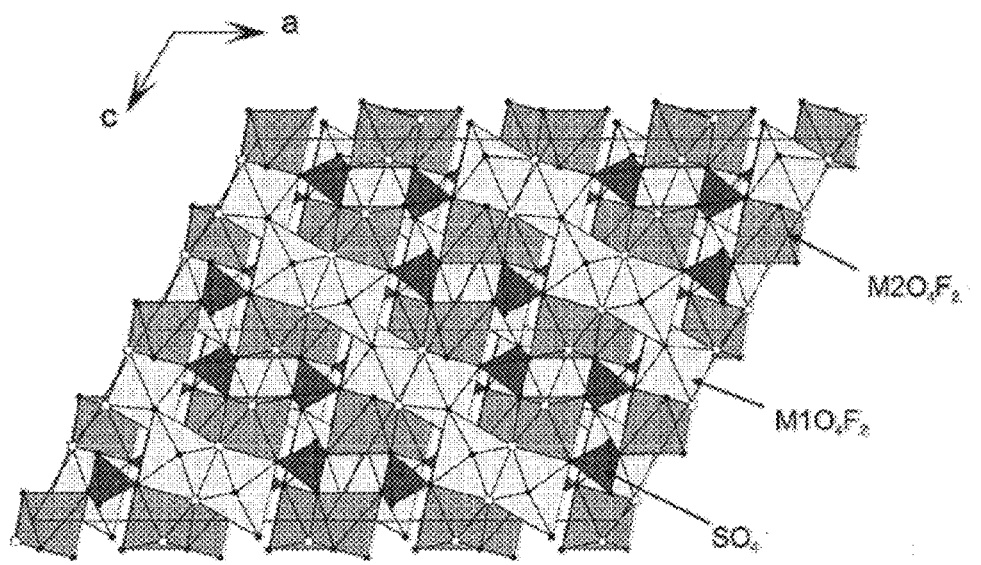
Figure 6:
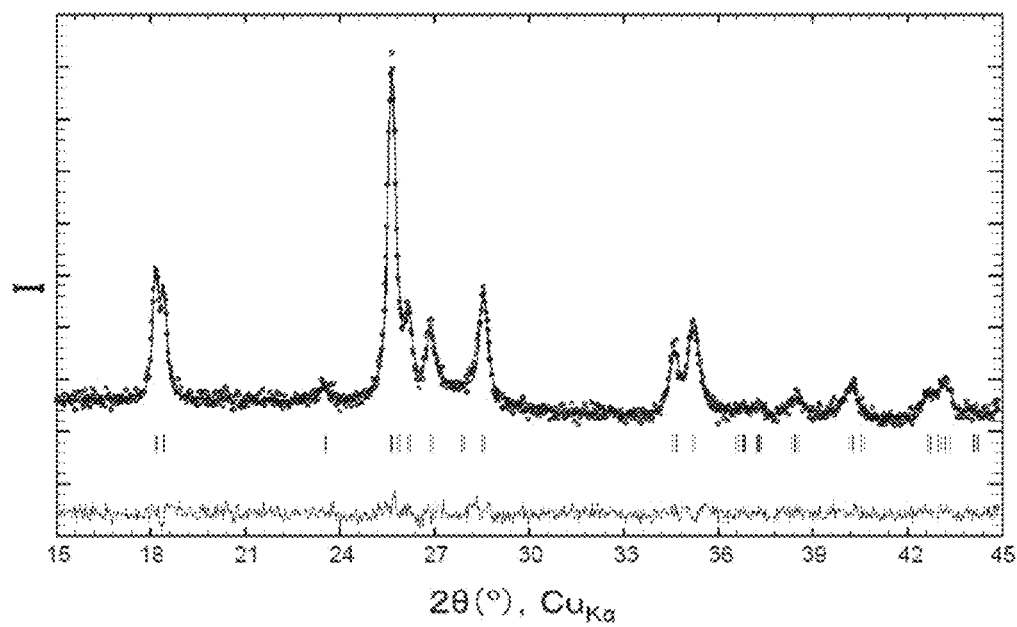
FIG. 6 is an X-ray diffractogram from Example 1, in accordance with one embodiment.

The samples were analyzed by X-ray diffraction. The diffractogram of the sample x=0.5 obtained is shown in FIG. 6. It shows that it is the solid solution Fe$_{0.5}$Mn$_{0.5}$SO$_4$.H$_2$O, the lattice parameters of which are as follows:

Monoclinic; space group: C2/c a=7.1170 Å, b=7.5661 Å, c=7.8486 Å, $\alpha=\gamma=90°$, $\beta=118.5779°$, V=371.15 Å$^3$.

Example 2

Dry Route

Working in a glovebox under argon, an equimolar mixture of LiF and of Fe and Mn mixed sulfate monohydrate was prepared in a ball mill (Spex 800) for 15 minutes, 1 g of the mixture was compacted in the form of a pellet which was introduced into a Teflon®-coated reactor, and the mixture was heated at the rate of 5° C./min up to 295° C. and maintained at this temperature for a certain time.

Various experiments were performed, by using a mixed sulfate with different contents x and by maintaining the temperature at 295° C. for different times.

The synthesis is complete after 24 hours, but a longer heating time improves the crystallographic quality of the material.

X-Ray Diffraction Characterization

The LiFe$_{1-x}$Mn$_x$SO$_4$F materials obtained in the various experiments were characterized. The lattice parameters are given in the table below, as a function of the value of x. They confirm the triplite structure (C2/c).

| x | a (Å) | b (Å) | c (Å) | α (°) | β (°) | γ (°) | V (Å³) |
|---|---|---|---|---|---|---|---|
| 0 | 5.1747 (3) | 5.4943 (3) | 7.2224 (3) | 106.522 (3) | 107.210 (3) | 97.791 (3) | 182.559 (16) |
| 0.05 | 12.9955 (1) | 6.3791 (8) | 9.8050 (4) | 90.0000 | 119.7017 (0) | 90.0000 | 706.05 (1) |
| 0.10 | 13.0204 (7) | 6.3801 (8) | 9.8320 (7) | 90.0000 | 119.7962 (0) | 90.0000 | 708.78 (9) |
| 0.15 | 13.0353 (9) | 6.3833 (0) | 9.8579 (2) | 90.0000 | 119.8689 (0) | 90.0000 | 711.31 (8) |
| 0.20 | 13.0696 (7) | 6.3883 (9) | 9.8969 (6) | 90.0000 | 119.9995 (0) | 90.0000 | 715.62 (9) |
| 0.50 | 13.1379 (0) | 6.3964 (5) | 9.9370 (5) | 90.0000 | 120.1830 (0) | 90.0000 | 721.85 (4) |
| 0.70 | 13.1773 (6) | 6.3997 (3) | 9.9669 (7) | 90.0000 | 120.3019 (0) | 90.0000 | 725.69 (7) |
| 0.90 | 13.2147 (7) | 6.4036 (3) | 10.0022 (8) | 90.0000 | 120.4286 (0) | 90.0000 | 729.82 (8) |
| 1 | 13.2701 (11) | 6.4161 (4) | 10.0389 (6) | 90.0000 | 120.5850 (3) | 90.0000 | 735.83 (5) |

Figure 7:
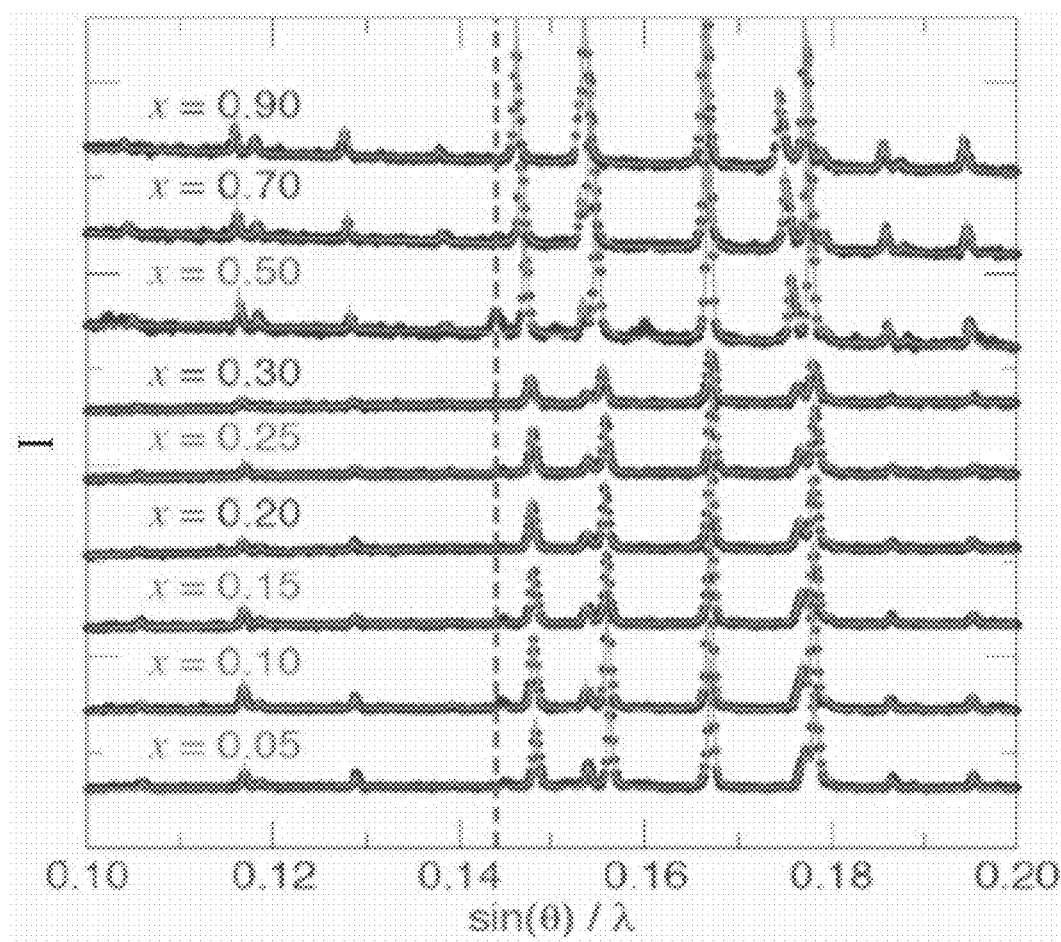
FIG. 7 is a diagram of the various materials from Example 2, in accordance with one embodiment.

The diagram for the various materials is shown in FIG. 7.

FIG. 7 shows that, for all the values x, the compound is obtained in the form of a solid solution of triplite structure. The line shifts towards the low angles when the Mn content increases results from the increase in the lattice parameters since the size of Mn is greater than that of Fe.

TEM Characterization

Figure 8:
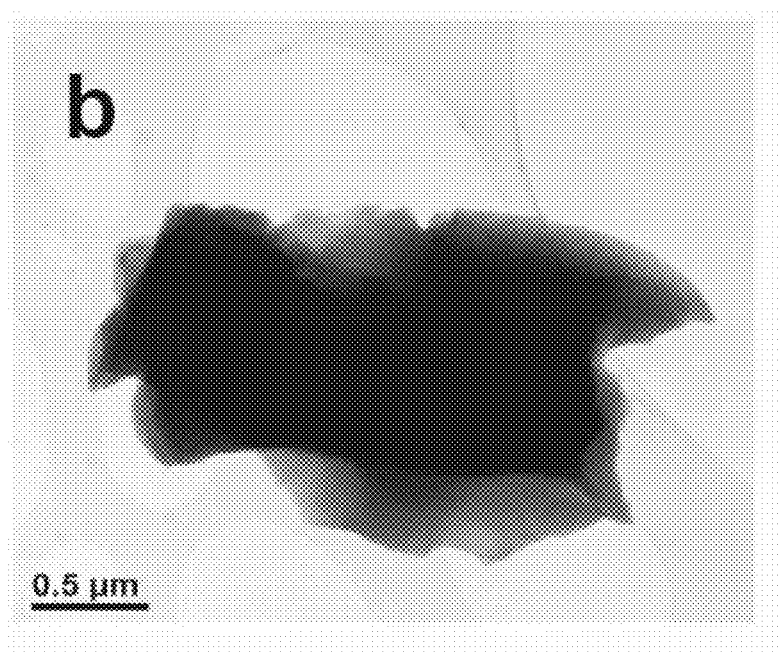
FIG. 8 is a high-resolution TEM micrography from Example 2, in accordance with one embodiment.

High-resolution TEM micrography of the compound for which x=0.20 is shown in FIG. 8. It shows that the compound is in the form of micrometric particles.

Differential Calorimetric Analysis (DSC)

Figure 9:
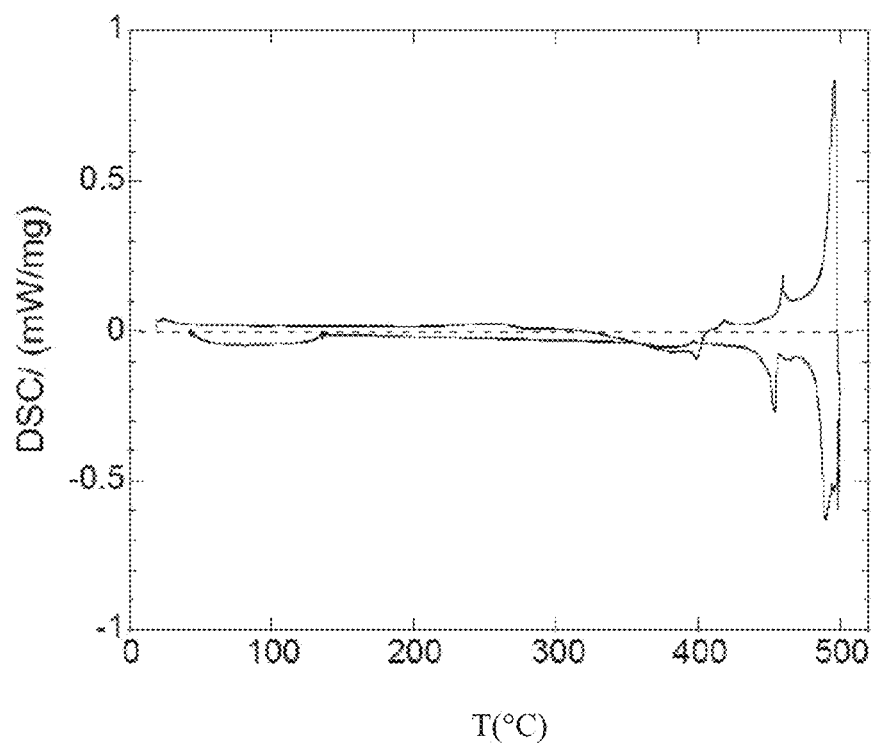
FIG. 9 are DSC curves obtained under an argon atmosphere in Example 2, in accordance with one embodiment.

FIG. 9 shows the DSC curves obtained under an argon atmosphere, with a heating rate of 10° C./min.

The upper curve corresponds to the differential scanning calorimetry (DSC), and the lower curve to the cooling of the sample. The accidents in the curves for temperatures above 400° C. indicate the start of thermal instability of the compound. The lower curve, collected on cooling, confirms the reversibility of the process.

Example 3

Ionothermal Route

An equimolar mixture of mixed sulfate monohydrate $Fe_{0.8}Mn_{0.2}SO_4.H_2O$ and of LiF was prepared in a ball mill (Spex 800) for 15 minutes, 1 g of mixture was introduced into a Teflon®-coated reactor, and 5 ml of ethylmethylimidazolium bis(trifluoromethane-sulfonyl)imide (EMI-TFSI) were added. The mixture was stirred for 20 minutes at room temperature while leaving the reactor open, and was then heated at a rate of 5° C./min up to 310° C. and maintained at this temperature, without stirring.

After cooling the reaction mixture to room temperature, the powder obtained was separated out by washing the ionic liquid twice with ethyl acetate, and was then dried in an oven at 60° C.

Various tests were performed by modifying the time of maintenance at 310° C. The triplite structure appears at and above 7 days of maintenance at this temperature.

The materials obtained in the various experiments were characterized.

TEM Characterization

Figure 10:
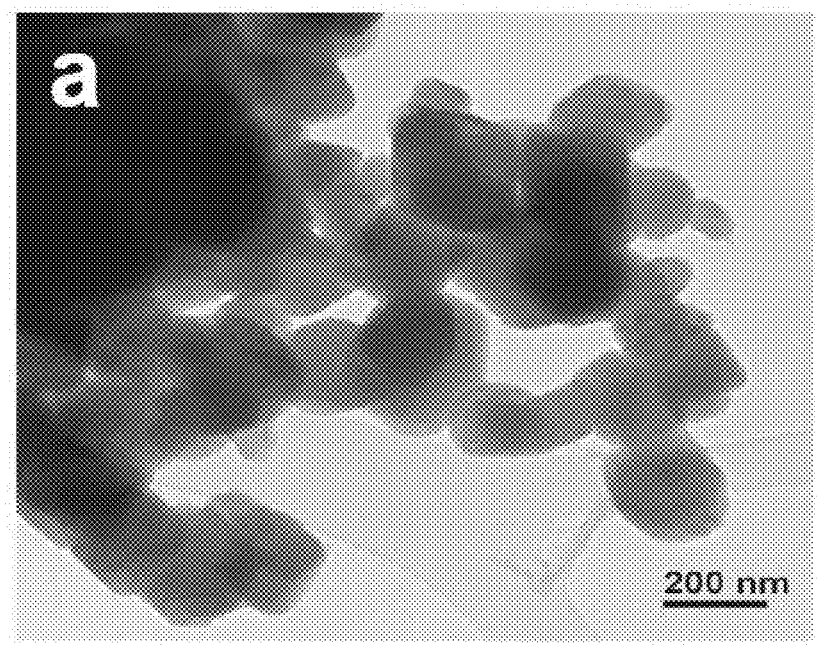
FIG. 10 are high-resolution TEM micrography in Example 3, in accordance with one embodiment.

High-resolution TEM micrography of the compound for which x=0.2 is shown in FIG. 10. It shows that the material is in the form of nanoparticles.

X-Ray Diffraction Characterization

Figure 11:
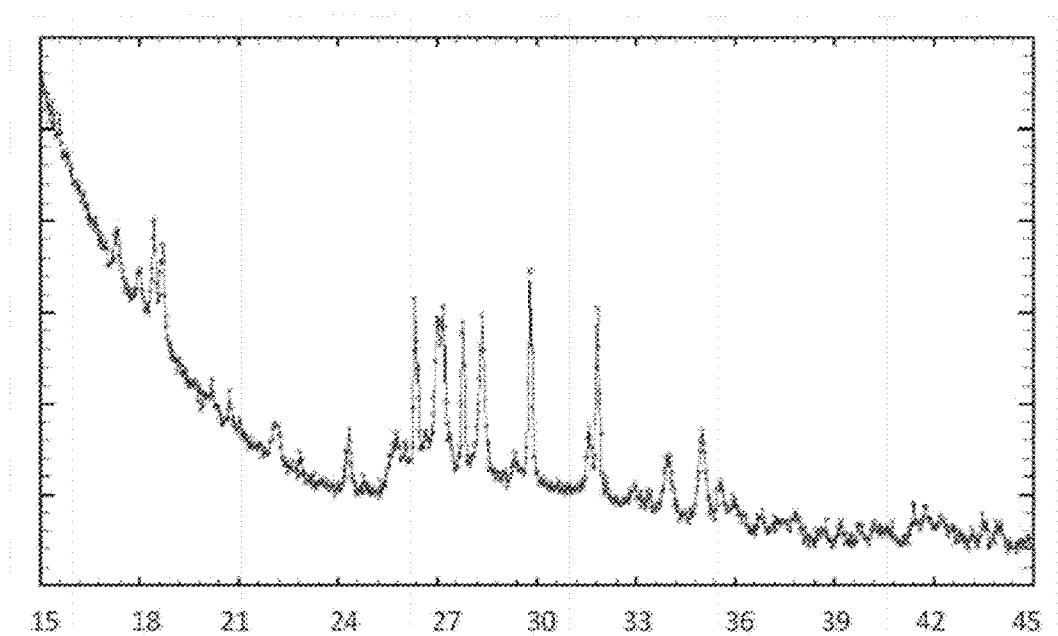
FIG. 11 is an diffraction diagram for a compound in Example 3, in accordance with one embodiment.

The diffraction diagram for the compound in which x=0.2, and which was obtained by maintaining a temperature of 310° C. for 7 days, is shown in FIG. 11. It shows the characteristic peaks of the triplite structure, and also a few residual peaks characteristic of the tavorite structure.

Example 4

Comparative $LiFe_{1-x}Mn_xSO_4F$ Solid Solution of Tavorite Structure

A compound $LiFe_{1-x}Mn_xSO_4F$ was prepared from LiF and from a solid solution $Fe_{1-x}Mn_xSO_4.H_2O$ as precursor.

Preparation of the Solid Solution $LiFe_{1-x}Mn_xSO_4F$

The synthesis was performed via the ionothermal route in an autoclave at 270° C., for various precursor samples.

A mixture of 0.85 g of $Fe_{0.5}Mn_{0.5}SO_4.H_2O$ and 0.149 g of LiF (mole ratio 1/1.14) prepared in a mortar was introduced into an autoclave containing 3 ml of 1-ethyl-3-methylimidazolium bis(trifluoromethane-sulfonyl)-imide (EMI-TFSI), the mixture was subjected to magnetic stirring for 20 minutes at room temperature, stirring was stopped and 2 ml of ionic liquid (EMI-TFSI) were added, and the mixture was kept at room temperature for 30 minutes without stirring. After closing the autoclave under argon, the assembly was placed in an oven at 200° C., the oven temperature was increased by 10° C. every 20 minutes up to 270° C., and maintained at this value for 48 hours, and was then allowed to cool slowly.

The powder formed during the heat treatment was separated from the ionic liquid by centrifugation, washed 3 times with 10 ml of dichloromethane, and then dried in an oven at 60° C.

Two other samples were prepared using a precursor $Fe_{1-x}Mn_xSO_4.H_2O$ in which x is, respectively, 0.10 and 0.20.

XRD Characterization

The samples $LiFe_{1-x}MnSO_4F$ in which x is, respectively, 0.05, 0.10 and 0.20 were characterized by X-ray diffraction. The diagram is shown in FIG. 12.

Figure 12:
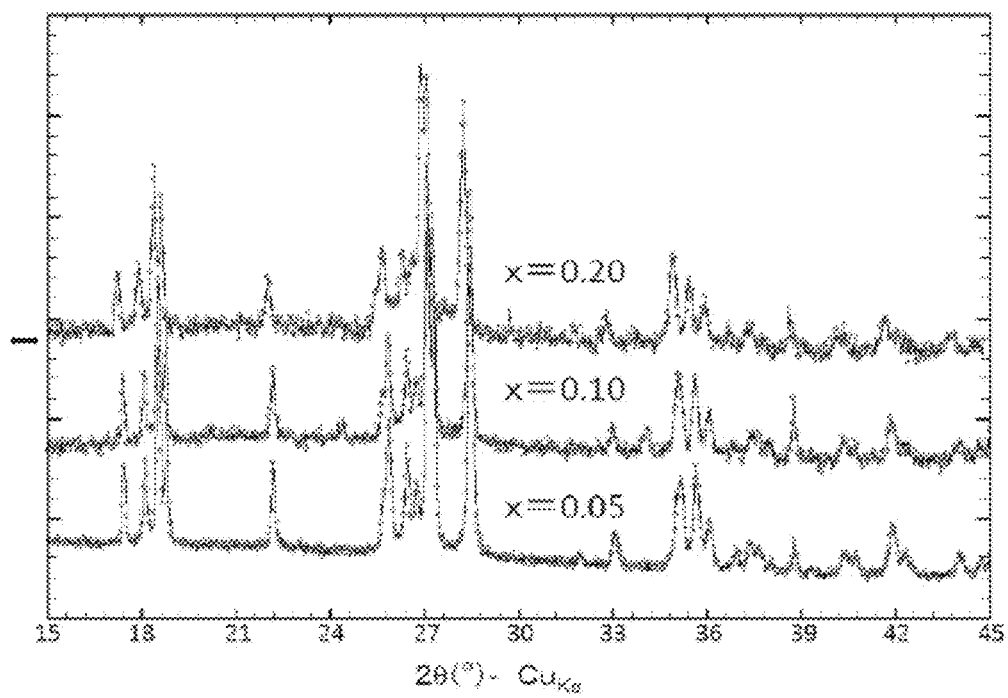
FIG. 12 are x-ray diffraction samples from Example 4, in accordance with one embodiment.

FIG. 12 shows that the compounds obtained have the tavorite structure.

Differential Calorimetric Analysis (DSC)

Figure 13:
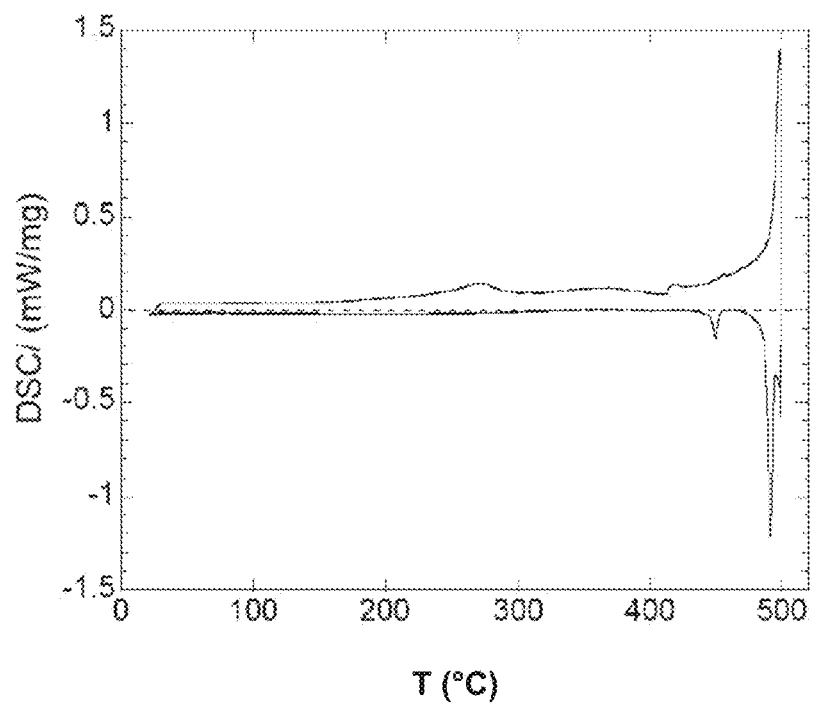
FIG. 13 is a characterization diagram obtained from a compound from Example 4, in accordance with one embodiment.

FIG. 13 shows the diagram obtained during the characterization of the compound. The characterization was performed, under an argon atmosphere, with a heating rate of 10° C./min. The upper curve corresponds to the differential scanning calorimetry (DSC), and the lower curve to the cooling of the sample. The accidents in the curves for temperatures above 350° C. indicate the start of thermal instability of the compound.

Comparison of this curve with FIG. 9 of the material (I) of example 2 shows that the triplite structure is more stable at elevated temperature than the tavorite structure.

Unit Cell Volume

Figure 14:
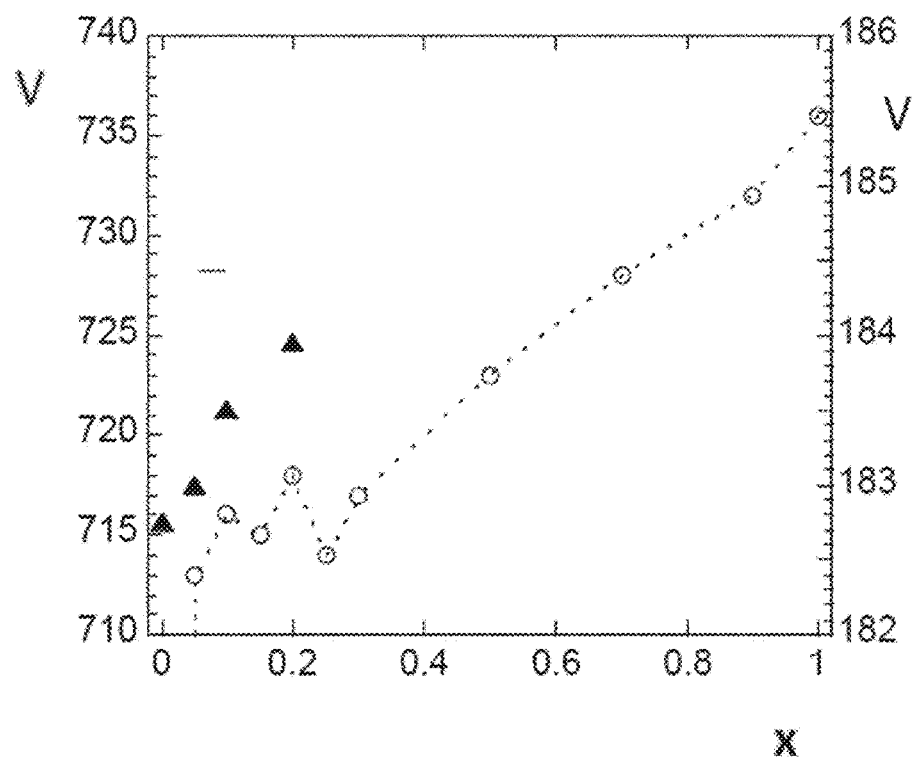
FIG. 14 shows the change in the unit cell volume for the material of triplite structure of Example 2 and for a material of tavorite structure according to comparative Example 4, in accordance with one embodiment.
Figure 15A:
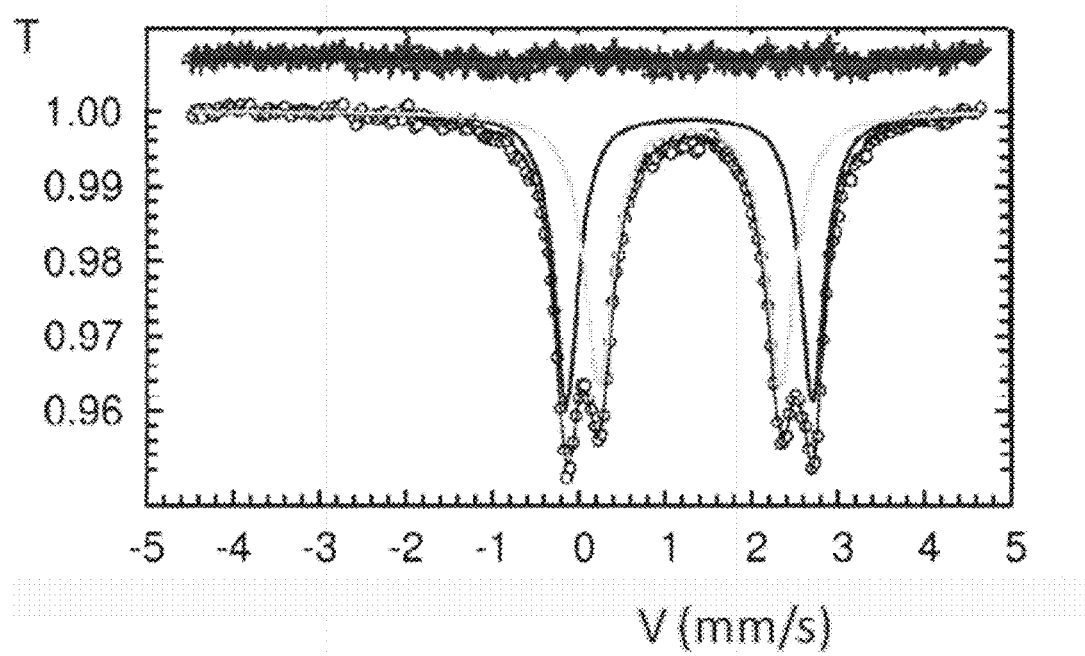
FIGS. 15a-15e are Mössbauer spectra from Example 5, in accordance with one embodiment.
Figure 15B:
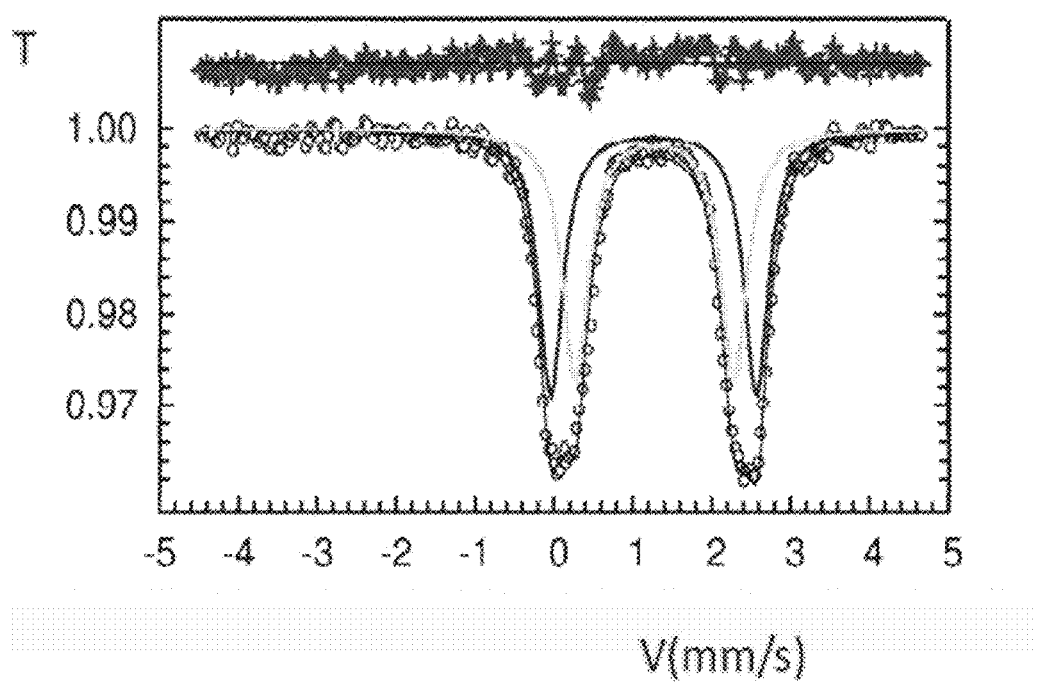
Figure 15C:
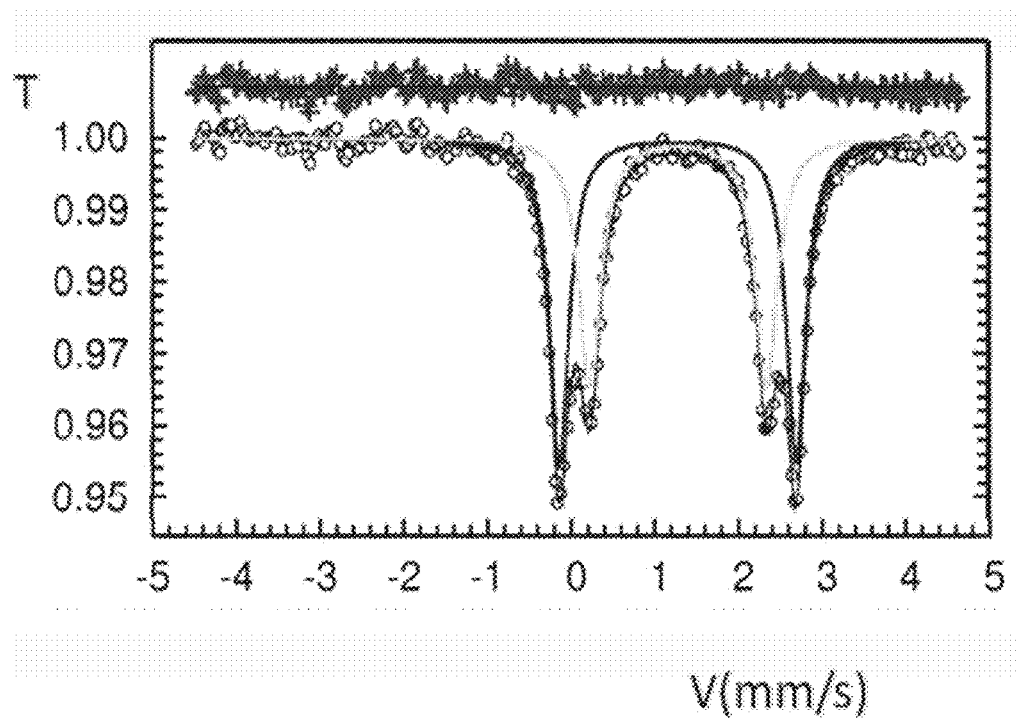
Figure 15D:
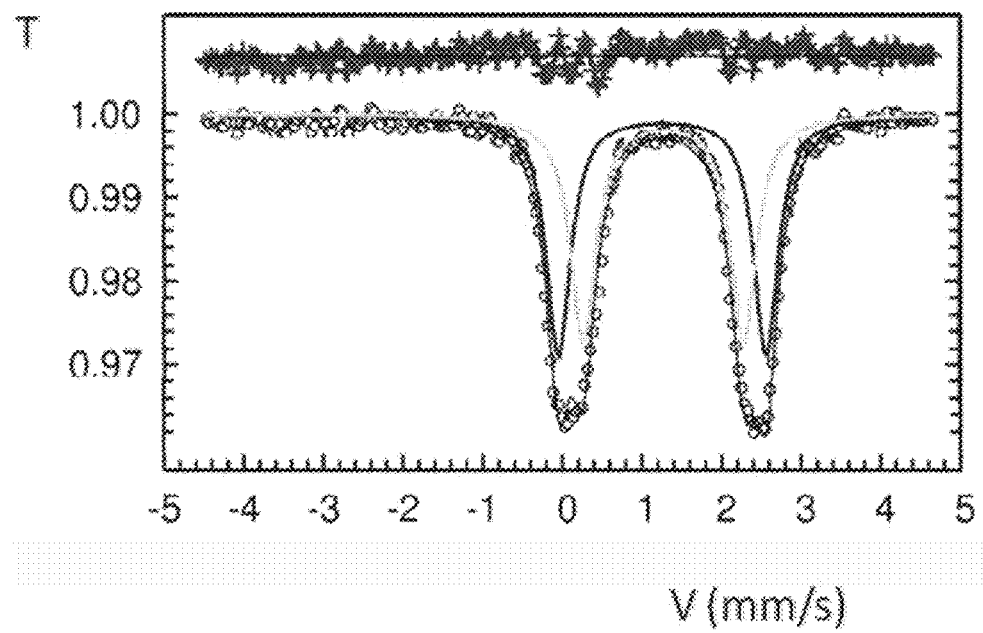
Figure 15E:
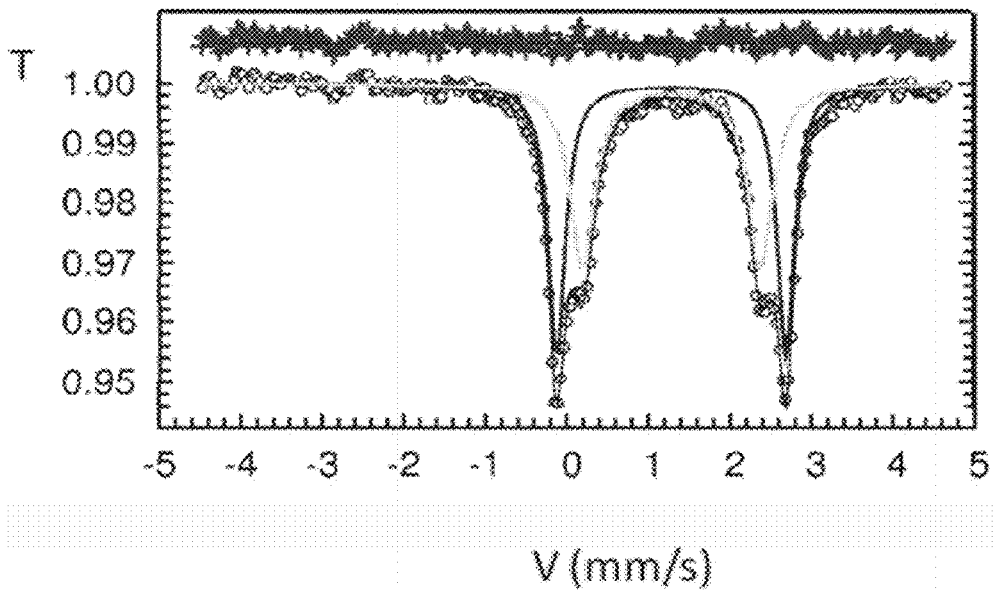

FIG. 14 shows the change in the unit cell volume for the material of triplite structure of example 2 and for a material of tavorite structure according to comparative example 4. The curve ▼▼▼ corresponds to tavorite, and the curve ooo corresponds to triplite. The unit cell volume V (in Å$^3$) is indicated on the y-axis (left-hand scale for tavorite, right-hand scale for triplite) and the manganese content x of the material is indicated on the x-axis. FIG. 14 shows the existence of a solid solution $LiMn_{1-x}Fe_xSO_4F$ for all the values of x such that 0<x<0.98 for which the triplite structure is maintained, whereas the tavorite solid solution $LiFe_{1-x}Mn_xSO_4F$ exists only for 0<x<0.3. In addition, at an equivalent Mn content, the unit cell volume in the triplite structure is lower than that of the tavorite structure.

Example 5

Mössbauer Characterization

A Mössbauer characterization was performed for the following materials:
(a) tavorite $LiFeSO_4F$;
(b) triplite $Li(Fe_{0.95}Mn_{0.05})SO_4F$, prepared according to example 2;
(c) tavorite $Li(Fe_{0.95}Mn_{0.05})SO_4F$, prepared according to example 4;
(d) triplite $Li(Fe_{0.8}Mn_{0.2})SO_4F$, prepared according to example 2,
(e) tavorite $Li(Fe_{0.8}Mn_{0.2})SO_4F$, prepared according to example 4.

The corresponding Mössbauer spectra are shown, respectively, in FIGS. 15a, 15b, 15c, 15d and 15e. The transmission is given on the y-axis and the velocity V (in mm/s) is given on the x-axis.

These figures show that a tavorite phase contains two quite sharp metal sites, whereas in a triplite phase, a broad peak covers two sites having an identical degree of occupancy.

Example 6

Electrochemical Tests

Samples of various fluorosulfates were tested as positive electrode material in a Swagelok® cell which is assembled under an argon atmosphere and in which the negative electrode is a lithium film, and the two electrodes are separated by a separator soaked with a 1M LiPF$_6$ solution in a 1/1 ethylene carbonate/dimethyl-carbonate EC-DMC mixture. The separator consists of two sheets of Whatman GF/D® borosilicate glass fiber.

For the production of a positive electrode, 75 mg of fluorosulfate and 25 mg of Super P® carbon black were mixed together by mechanical milling in a Spex 800 mill for 10 minutes under argon. An amount of mixture corresponding to 7-10 mg of material (I$_{0.3}$) per cm$^2$ was applied to an aluminum current collector.

Several identical cells, which differ only by the cathode material, were assembled. They were subjected to galvanostatic charging/discharging cycles at 20° C. using a Mac-Pile system (Biologic SA, Claix, France). The cycling was performed between 2.5 V and 4.5 V vs Li$^+$/Li$^0$, with a rate of C/20 (exchange of 1 Li$^+$ ion in 20 hours).

The following materials were tested:
(a) tavorite $Li_{1-y}(Fe_{0.9}Mn_{0.1})SO_4F$, prepared according to example 4;
(b) triplite $Li_{1-y}(Fe_{0.9}Mn_{0.1})SO_4F$, prepared according to example 2;
(c) tavorite $Li_{1-y}(Fe_{0.8}Mn_{0.2})SO_4F$, prepared according to example 4;
(d) triplite $Li_{1-y}(Fe_{0.8}Mn_{0.2})SO_4F$, prepared according to example 2.

Figure 16A:
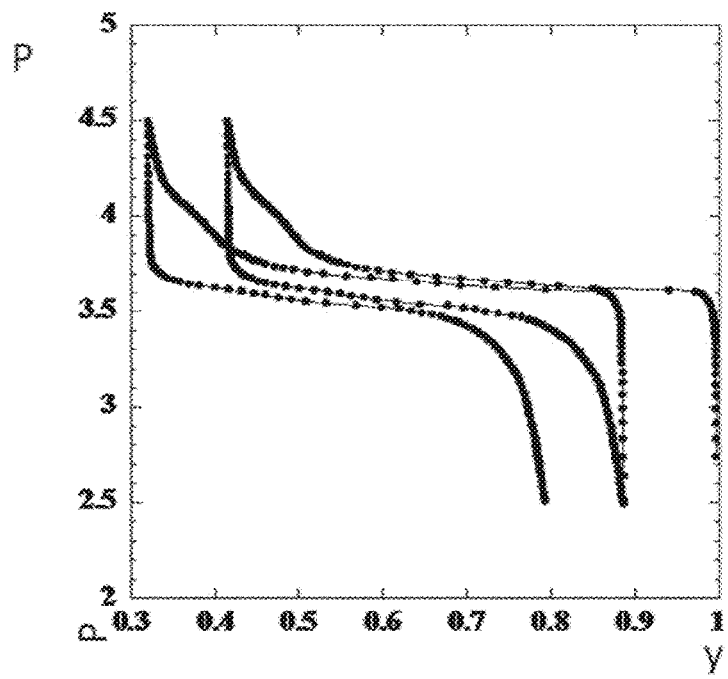
FIG. 16a and 16b are curves for the tavorite compounds (a) and triplite compounds (h) from Example 6, in accordance with one embodiment.
Figure 16B:
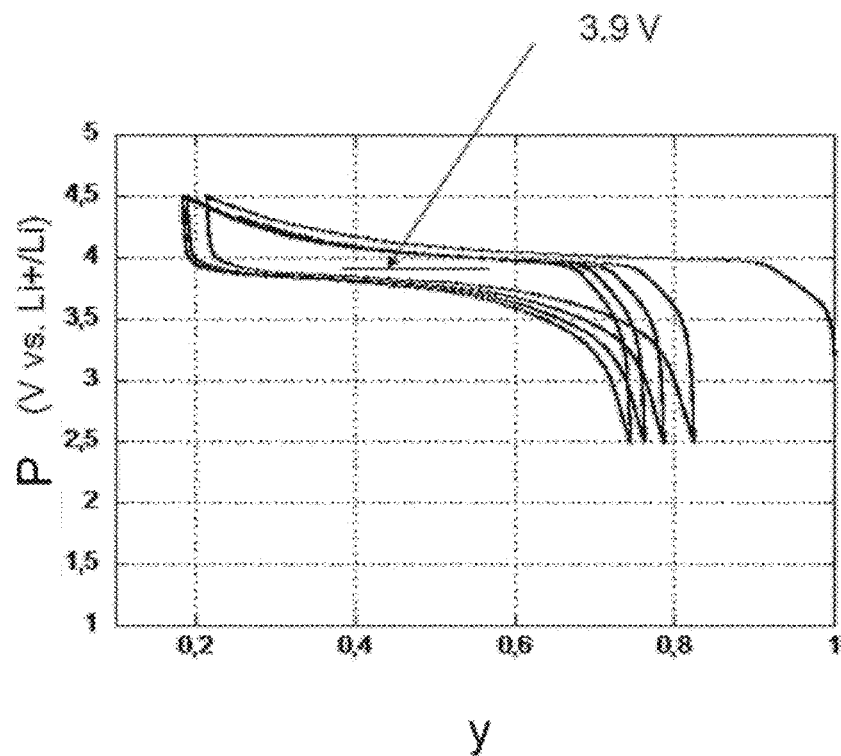
Figure 17A:
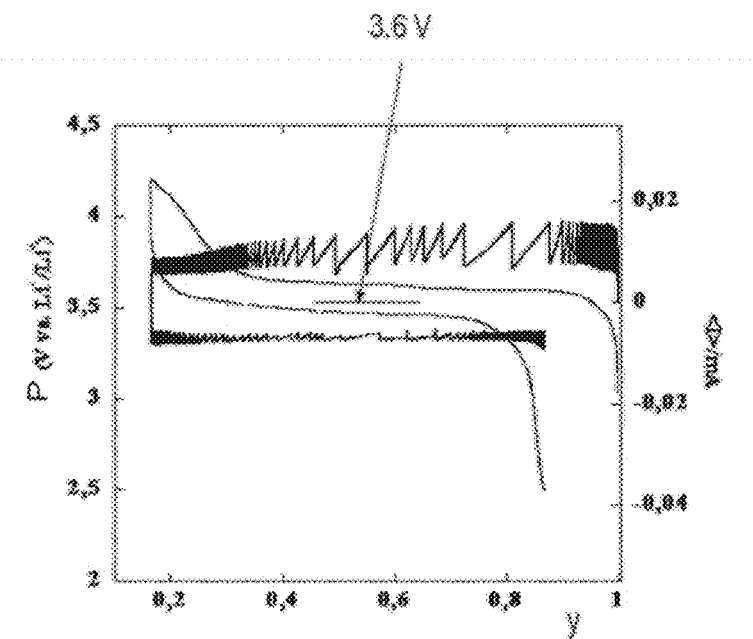
FIGS. 17a and 17b are curves for the tavorite compounds (a) and triplite compounds (b) from Example 7, in accordance with one embodiment.
Figure 17B:
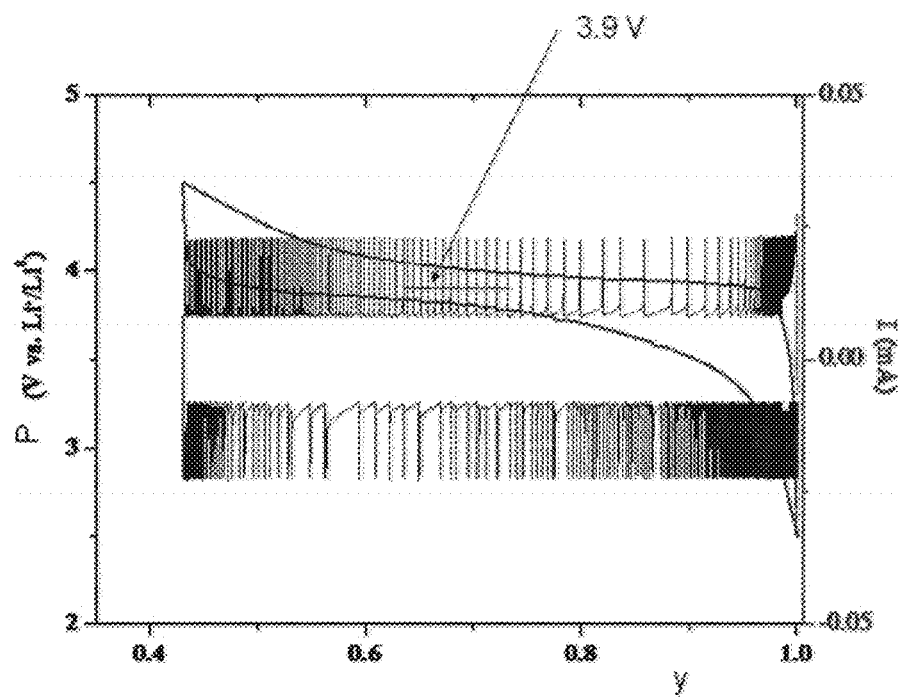

The curves are shown in FIGS. 16a and 16b for the tavorite compounds (a) and triplite compounds (b) in which x=0.1. The curves are shown in FIGS. 17a and 17b for the tavorite compounds (a) and triplite compounds (b) in which x=0.2. The variation in potential P (in V) vs Li$^0$/Li$^+$ is indicated on the y-axis, as a function of the degree y of insertion of Li$^+$ ions on the x-axis. The operating potential is demonstrated in the figures, which clearly show that the potential is higher for triplite, at an identical content of Mn.

These curves show that the materials with a tavorite phase have a redox plateau at 3.6 V, whereas the materials of the same composition but which have a triplite structure have a redox plateau close to 3.9 V. Thus, the assembly gives an energy density of 130×3.9 for triplite compared with 130×3.6 for tavorite, which corresponds to a 10% increase.

Example 7

An equimolar mixture of iron manganese sulfate monohydrate $Fe_{1-x}Mn_xSO_4H_2O$ prepared according to example 1, and of LiF, was prepared, working under an argon atmosphere. The mixture was milled for 15 minutes in a ball mill (Spex 800). Next, 1 g of the mixture was introduced into a 33 ml Teflon®-coated autoclave with 3 g of polyethylene glycol polymer (M$_w$=20 000), the powder mixture being placed between two layers of polymer which, firstly, serve as support for the reaction between the sulfate precursors, and, secondly, avoids the oxidation of the iron(II) on contact with the air due to the fact that Teflon® is porous. The autoclave was heated at a rate of 3° C./min up to 300° C. and was maintained at this temperature for a certain time.

The upper polymer layer is necessary to avoid oxidation of the iron(II) on contact with air due to the fact that Teflon® is porous.

Various experiments were performed with different contents x of manganese (x=0.05 and x=0.10) and different heating times at 300° C. (48 hours, 10 days and 20 days).

It was found that the synthesis is complete after a heating time of 3 weeks, but that a longer time improves the crystallinity of the powder.

X-Ray Diffraction Characterization

Figure 18:
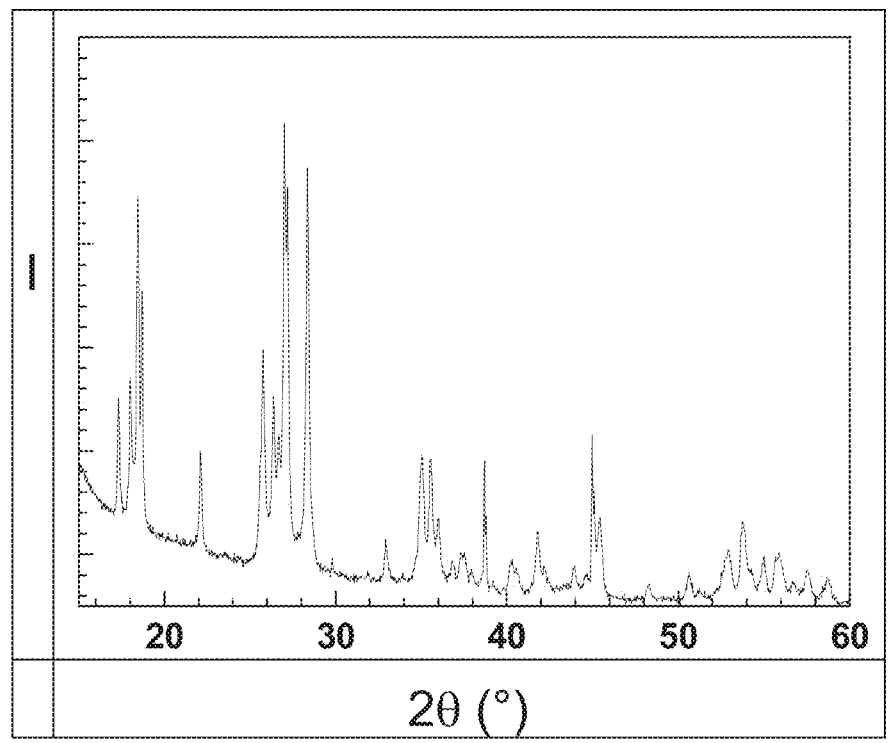
FIGS. 18, 19 and 20 are diffractograms of the material LiFe$_{0.95}$Mn$_{0.05}$SO$_4$.F obtained, respectively, after 48 hours, 10 days and 20 days of heating from Example 7, in accordance with one embodiment.
Figure 19:
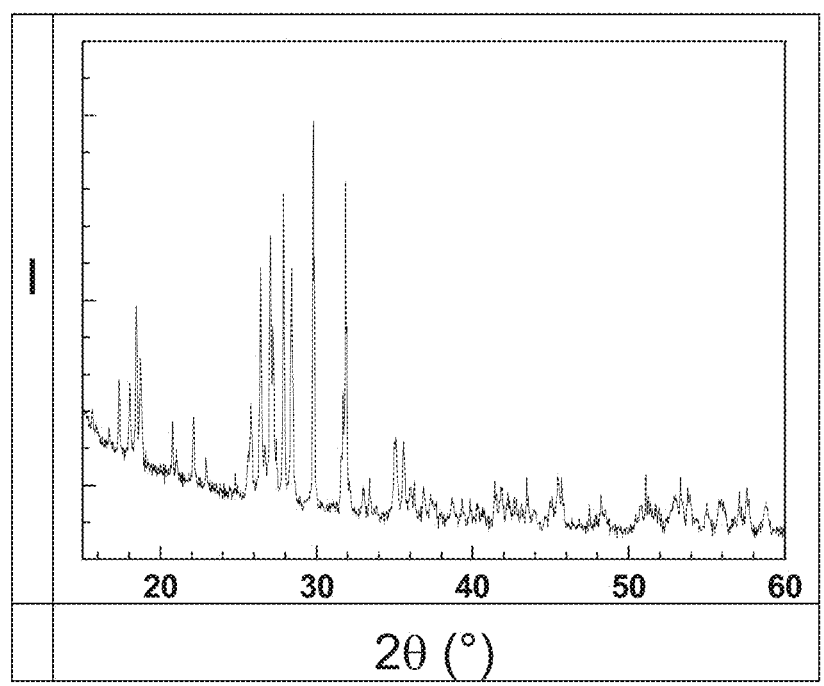
Figure 20:
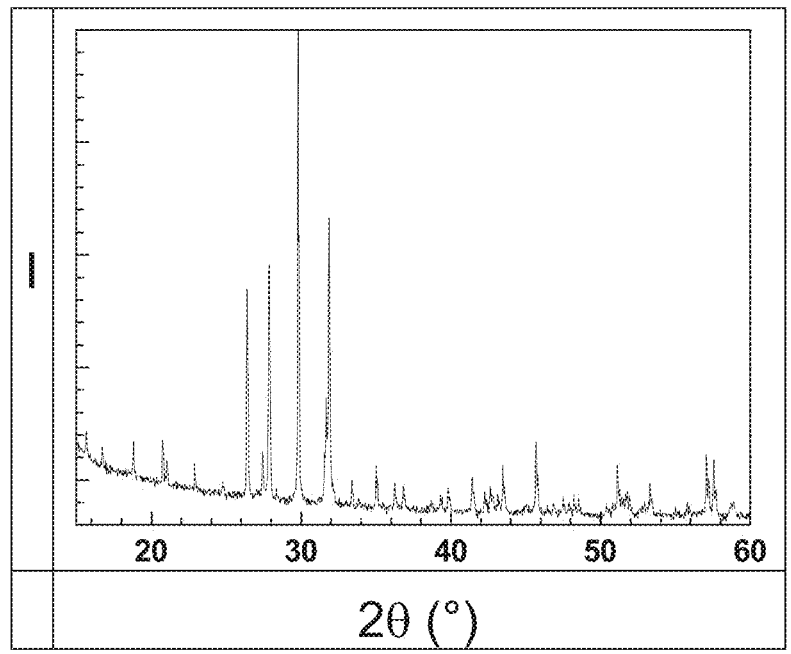

FIGS. 18, 19 and 20 show the diffractograms of the material $LiFe_{0.95}Mn_{0.05}SO_4F$ obtained, respectively, after hours, 10 days and 20 days of heating. In these figures, the intensity I (in arbitrary units) is given on the y-axis. They show that:
the material $LiFe_{0.95}Mn_{0.05}SO_4F$ adopts a single structure of tavorite type after a heating time of hours (material M48)
triclinic system; space group: P-1
a=5.178(8) Å, b=5.486(3) Å, c=7.225(9) Å
α=106.491(3)° β=107.163(6)° γ=97.906(5)°
V=182.473(4) Å$^3$
the material $LiFe_{0.95}Mn_{0.05}SO_4F$ is a mixture of two different phases after 10 days of heating, one adopting a tavorite structure, the other a triplite structure (material M10)
the material $LiFe_{0.95}Mn_{0.05}SO_4F$ adopts a single structure of triplite type after 20 days of heating (material M20)
monoclinic system; space group: C2/c a=12.996(1) Å, b=6.380(8) Å, c=9.805(3) Å
α=90° β=119.701(8)° γ=90°
V=706.054(1) Å$^3$

Example 8

Electrochemical Tests

Samples of various fluorosulfates obtained according to example 7 were tested as positive electrode material, under conditions similar to those used in example 6. The mechanical milling was performed for 15 minutes using a 15 cm$^3$ stainless-steel cell and a ball 12 mm in diameter. The amount of material on the current collector of the positive electrode is 6-8 mg/cm$^2$.

Figure 21:
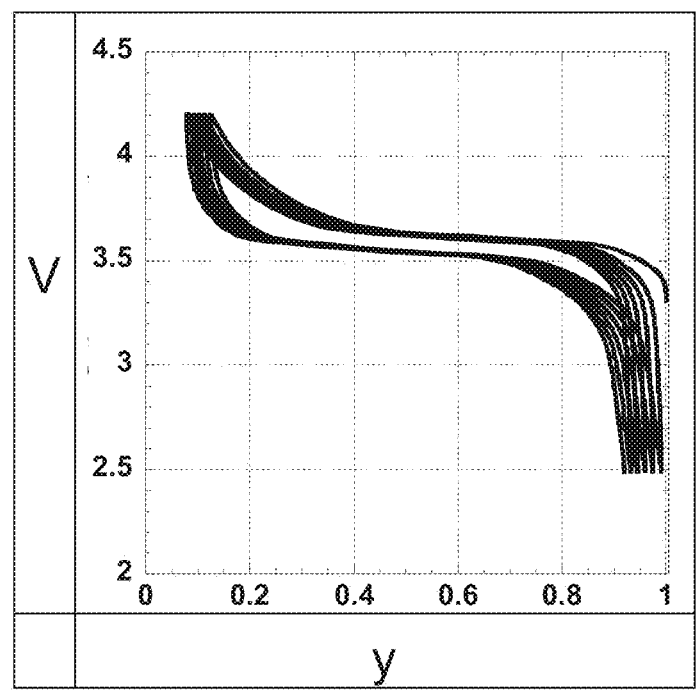
FIGS. 21-24 are diagrams showing the variation in potential P on the y-axis (in volts vs. Li$^0$/Li$^+$) as a function of the degree y of insertion of the lithium, for the following materials, respectively.
Figure 22:
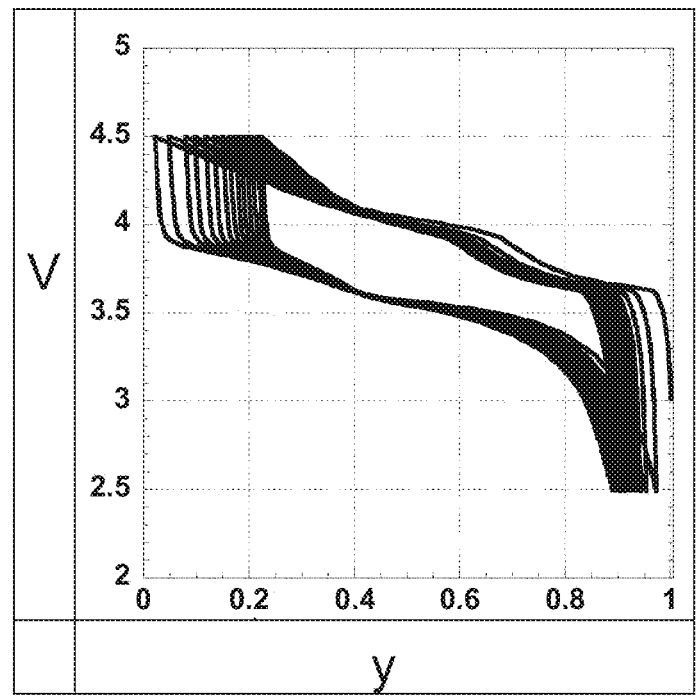
Figure 23:
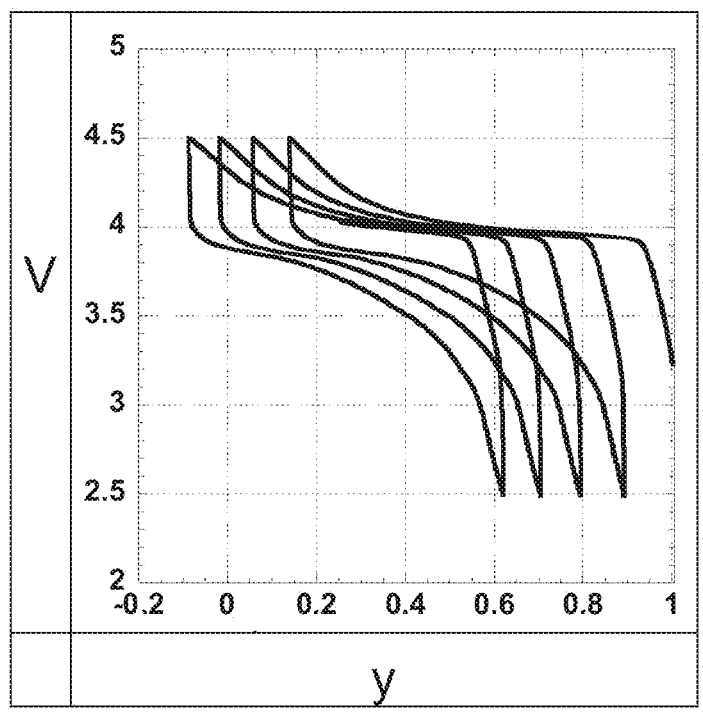
Figure 24:
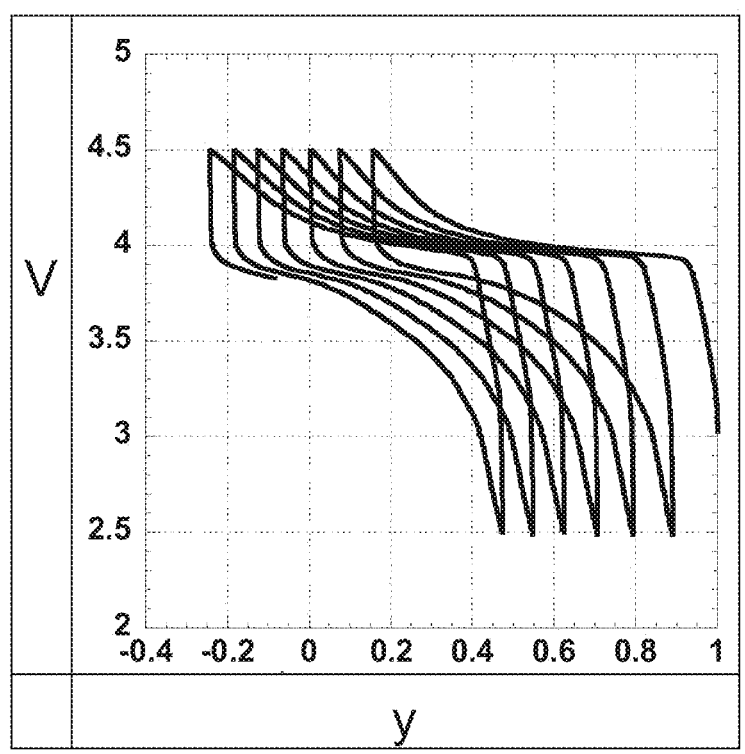

Each of the FIGS. 21 to 24 shows the variation in potential P on the y-axis (in volts vs. Li$^0$/Li$^+$) as a function of the degree y of insertion of the lithium, for the following materials, respectively:

FIG. 21: M48 tavorite—Li$_{1-y}$Fe$_{0.95}$Mn$_{0.05}$SO$_4$F,
FIG. 22: M10 tavorite-triplite—Li$_{1-y}$Fe$_{0.95}$Mn$_{0.05}$SO$_4$F,
FIG. 23: M20 triplite—Li$_{1-y}$Fe$_{0.95}$Mn$_{0.05}$SO$_4$F
FIG. 24: M'20 the material Li$_{1-y}$Fe$_{0.9}$Mn$_{0.1}$SO$_4$F of example 7 which underwent a heat treatment for 20 days.

The electrochemical curves show that the material of tavorite structure has a redox plateau at 3.6 V vs. Li$^0$/Li$^+$, whereas the materials of triplite structure (M20 and M'20) have a redox plateau close to 3.9 V vs. Li$^0$/Li$^+$. The material consisting of a mixture of two phases, one of tavorite structure and the other of triplite structure, has two redox plateaux for the same Fe$^{3+}$/Fe$^{2+}$ couple: the first at 3.6 V vs. Li$^0$/Li$^+$ corresponding to the tavorite phase, and the second at 3.9 V vs. Li$^0$/Li$^+$ corresponding to the triplite phase.

The invention claimed is:
1. A material comprising particles of a fluorosulfate the structure of which corresponds to formula (I) Li$_{1-y}$Fe$_{1-x}$Mn$_x$SO$_4$F (I) in which 0<x≤0.1 and 0≤y<1,
wherein said material essentially has a phase of triplite structure and optionally a phase of tavorite structure, the phase of triplite structure representing at least 50% by volume.

* * * * *

UNITED STATES PATENT AND TRADEMARK OFFICE
CERTIFICATE OF CORRECTION

PATENT NO. : 9,444,102 B2
APPLICATION NO. : 14/002424
DATED : September 13, 2016
INVENTOR(S) : Tarascon et al.

It is certified that error appears in the above-identified patent and that said Letters Patent is hereby corrected as shown below:

On the title page, item 73

"Université de Picardie Jules Verne"

is added as an assignee.

Signed and Sealed this
Twenty-ninth Day of November, 2016

Michelle K. Lee
*Director of the United States Patent and Trademark Office*